United States Patent
Hyun et al.

(10) Patent No.: US 10,807,999 B2
(45) Date of Patent: Oct. 20, 2020

(54) SILOXANE MONOMER, COMPOSITION FOR PREPARATION OF SILICONE HYDROGEL LENS CONTAINING SAME, AND SILICONE HYDROGEL LENS

(71) Applicant: INTEROJO INC., Pyeongtaek-si, Gyeonggi-do (KR)

(72) Inventors: Sang Il Hyun, Seoul (KR); Soo Chang Lee, Yongin-si (KR); Kyung Hee Oh, Pyeongtaek-si (KR); Dong Hun Shin, Pyeongtaek-si (KR)

(73) Assignee: INTEROJO INC., Gyeonggi-do (KR)

( * ) Notice: Subject to any disclaimer, the term of this patent is extended or adjusted under 35 U.S.C. 154(b) by 127 days.

(21) Appl. No.: 15/999,596

(22) PCT Filed: Feb. 17, 2017

(86) PCT No.: PCT/KR2017/001759
§ 371 (c)(1),
(2) Date: Aug. 20, 2018

(87) PCT Pub. No.: WO2017/142343
PCT Pub. Date: Aug. 24, 2017

(65) Prior Publication Data
US 2019/0085000 A1 Mar. 21, 2019

(30) Foreign Application Priority Data
Feb. 18, 2016 (KR) .................. 10-2016-0018978
Feb. 16, 2017 (KR) .................. 10-2017-0021250

(51) Int. Cl.
| | | |
|---|---|---|
| G02B 1/04 | (2006.01) |
| C07F 7/08 | (2006.01) |
| G02C 7/04 | (2006.01) |
| C08F 283/12 | (2006.01) |
| C08G 77/44 | (2006.01) |
| B29D 11/00 | (2006.01) |
| C08L 83/10 | (2006.01) |
| C08F 222/20 | (2006.01) |
| C08F 226/10 | (2006.01) |
| C08G 77/14 | (2006.01) |
| C08G 77/24 | (2006.01) |
| C08G 77/20 | (2006.01) |
| C08G 77/12 | (2006.01) |
| B29K 83/00 | (2006.01) |
| B29K 105/00 | (2006.01) |

(52) U.S. Cl.
CPC ........ *C07F 7/081* (2013.01); *B29D 11/00038* (2013.01); *B29D 11/00192* (2013.01); *C07F 7/0838* (2013.01); *C08F 222/20* (2013.01); *C08F 226/10* (2013.01); *C08F 283/124* (2013.01); *C08G 77/44* (2013.01); *C08L 83/10* (2013.01); *G02B 1/043* (2013.01); *G02C 7/04* (2013.01); *B29K 2083/00* (2013.01); *B29K 2105/0002* (2013.01); *B29K 2105/0061* (2013.01); *B29K 2823/12* (2013.01); *C08F 222/205* (2020.02); *C08G 77/12* (2013.01); *C08G 77/14* (2013.01); *C08G 77/20* (2013.01); *C08G 77/24* (2013.01)

(58) Field of Classification Search
CPC ..................................................... G02B 1/043
See application file for complete search history.

(56) References Cited

U.S. PATENT DOCUMENTS

| | | | |
|---|---|---|---|
| 4,640,941 A * | 2/1987 | Park .................. | C08F 30/08 523/107 |
| 5,081,164 A * | 1/1992 | Lai .................. | A61K 6/887 522/77 |
| 5,258,490 A | 11/1993 | Chang | |
| 2014/0066540 A1 | 3/2014 | Ueyama et al. | |
| 2015/0011670 A1 | 1/2015 | Saxena et al. | |

FOREIGN PATENT DOCUMENTS

| | | |
|---|---|---|
| JP | 11-287971 A | 10/1999 |
| KR | 2000-0023541 A | 4/2000 |
| KR | 10-2007-0080847 A | 8/2007 |
| KR | 10-1271584 B1 | 6/2013 |

OTHER PUBLICATIONS

International Search Report of corresponding Patent Application No. PCT/KR2017/001759—4 pages (dated May 22, 2017).

* cited by examiner

*Primary Examiner* — Michael F Pepitone
(74) *Attorney, Agent, or Firm* — Knobbe Martens Olson & Bear LLP

(57) ABSTRACT

The present invention relates to a siloxane monomer used in the production of a silicone hydrogel lens, a composition for the preparation of a lens containing the same, and a silicone hydrogel lens prepared from the same, wherein the silicone hydrogel lens according to the present invention has a feature of easy release from a component of a mold.

12 Claims, No Drawings

SILOXANE MONOMER, COMPOSITION FOR PREPARATION OF SILICONE HYDROGEL LENS CONTAINING SAME, AND SILICONE HYDROGEL LENS

CROSS-REFERENCES TO RELATED APPLICATIONS

Any and all applications for which a foreign or domestic priority claim is identified in the Application Data Sheet as filed with the present application are hereby incorporated by reference and made a part of the present disclosure.

TECHNICAL FIELD

The present invention relates to a siloxane monomer used in preparation of a silicone hydrogel lens, a composition for preparation of a lens containing the same, and a silicone hydrogel lens prepared from the same. The silicone hydrogel lens according to the present invention has a feature of easy release from a surface of a component of a mold even without a separate solvent.

BACKGROUND ART

Various contact lenses have been commercially prepared for many years. Earlier contact lenses were made from hard materials and these lenses are still used in some application fields even at present, but are not suitable for all patients because they are less comfortable to wear. Thereafter, soft contact lenses based on hydrogels have been developed and are very popular today. These lenses are able to be prepared by molding lenses in a mold. For example, a first mold component having a convex surface corresponding to a rear curved surface of the ophthalmic lens, and a second mold component having a concave surface corresponding to a front curved surface of the ophthalmic lens. In order to prepare a lens using the mold component, an uncured hydrogel lens composition is placed between the concave surface and the convex surface of the mold component and then cured. After curing, the mold components are separated according to a typical procedure, and the lens remains attached to one mold component. The lens is detached from the remaining mold component through a releasing process.

According to the related art, the lens may be released from the mold by exposing the lens to an aqueous solution or a salt solution so that the solution inflates the lens to lower adhesion between the lens and the mold.

An attempt has also been made to release a silicone hydrogel lens using an organic solvent. U.S. Pat. No. 5,258,490 discloses a method in which a lens is impregnated with alcohol, ketone, aldehyde, ester, amide or N-alkylpyrrolidone in the absence of water for 20 to 40 hours or impregnated with a mixture containing water as a minor component.

As another method for accelerating the release, Korean Patent Laid-Open Publication No. 10-2007-0080847 discloses a method of accelerating mold release by mixing polyethylene glycol (PEG) in a lens composition or a material of a mold component.

However, among the known methods, methods using an aqueous solution are not effective for silicone hydrogel lenses containing a large amount of silicone, which is a hydrophobic raw material, and a method using an organic solvents is somewhat successful, but the use of highly concentrated organic solution may have disadvantages such as safety hazards, increased risk of shut down of production lines, costly release solution, and possible secondary damage due to explosions, and the like. Further, when Polyethylene glycol (PEG) is used, the process becomes complicated or physical properties of the lens may be affected when mixing PEG with the lens composition.

The silicone hydrogel lens in a cured state has a problem in that it is difficult to separate the lens from the mold due to physical properties such ds flexibility and surface stickiness according to the nature of the material. Therefore, several methods as described above have been proposed, but in order to solve this problem fundamentally, it is more advantageous to prepare lenses using a silicone raw material that improves the flexibility and surface stickiness of silicone hydrogel lenses.

DISCLOSURE

Technical Problem

An object of the present invention is to provide a siloxane monomer facilitating release of a silicone hydrogel lens from a component of a mold, and a silicone hydrogel lens using the siloxane monomer.

Another object of the present invention is to provide a siloxane monomer having excellent releasability while simultaneously having the same level of the water content and the oxygen permeability coefficient as the existing silicone hydrogel lens, and a silicone hydrogel lens using the siloxane monomer.

Technical Solution

In order to achieve the above-described objects, the present inventors intensively studied characteristics of soft contact lens materials, and as a result, found that a silicone hydrogel lens had improved releasability from a component of a desired mold by introducing an aromatic structure such as a phenyl group into a silicone raw material of silicone hydrogel, and completed the present invention.

In one general aspect, there is provided a siloxane monomer represented by Chemical Formula 1 below and used in preparation of a silicone hydrogel lens which is easy to release from a component of a mold:

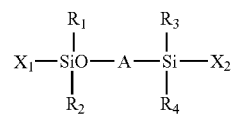

[Chemical Formula 1]

in Chemical Formula 1,
$R_1$, $R_2$, $R_3$ and $R_4$ are each independently selected from hydrogen, $(C_1$-$C_{10})$alkyl, and
A is a linking group represented by Chemical Formula 2 below, and $X_1$ and $X_2$ are each independently a substituent represented by Chemical Formula 3 below:

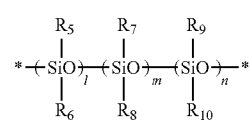

[Chemical Formula 2]

in Chemical Formula 2, l, m and n are each independently an integer selected from 0 to 200, and l+m+n>0, $R_5$, $R_6$, $R_7$, $R_8$, $R_9$ and $R_{10}$ are each independently selected from hydrogen, $(C_1-C_{10})$alkyl, fluorine-substituted $(C_1-C_{10})$alkyl, and $$*\!-\!\!\overset{L_1}{\diagup}\!\!\left(\!O\diagdown\diagup\!\right)_{\!q}\!\!\overset{O}{\diagdown}\!R_{11},$$

$L_1$ is $(C_1-C_4)$alkylene, $R_{11}$ is hydrogen or $(C_1-C_3)$alkyl, and q is an integer of 1 to 20,

[Chemical Formula 3]

$$*\!-\!(CH_2)_{\!o}\!-\!B\!-\!(CH_2)_{\!p}\!-\!O\!-\!\underset{\underset{O}{\|}}{C}\!-\!\underset{R_{11}}{C}\!=\!CH_2$$

in Chemical Formula 3, o and p are each independently an integer selected from 1 to 10, B is $(C_6-C_{10})$arylene, and $R_{11}$ is hydrogen or a methyl group.

More specifically, the Chemical Formula 2 may be selected from the following Chemical Formula 2-1:

[Chemical Formula 2-1]

$$*\!-\!\!\left(\!\underset{R_6}{\overset{R_5}{\underset{|}{\overset{|}{Si}}O}}\!\right)_{\!l}\!\!-\!\!*, \quad *\!-\!\!\left(\!\underset{R_8}{\overset{R_7}{\underset{|}{\overset{|}{Si}}O}}\!\right)_{\!m}\!\!-\!\!*, \quad *\!-\!\!\left(\!\underset{R_{10}}{\overset{R_9}{\underset{|}{\overset{|}{Si}}O}}\!\right)_{\!n}\!\!-\!\!*$$

$$*\!-\!\!\left(\!\underset{R_6}{\overset{R_5}{\underset{|}{\overset{|}{Si}}O}}\!\right)_{\!l}\!\!\left(\!\underset{R_8}{\overset{R_7}{\underset{|}{\overset{|}{Si}}O}}\!\right)_{\!m}\!\!-\!\!*, \quad *\!-\!\!\left(\!\underset{R_8}{\overset{R_7}{\underset{|}{\overset{|}{Si}}O}}\!\right)_{\!m}\!\!\left(\!\underset{R_{10}}{\overset{R_9}{\underset{|}{\overset{|}{Si}}O}}\!\right)_{\!n}\!\!-\!\!*,$$

$$*\!-\!\!\left(\!\underset{R_6}{\overset{R_5}{\underset{|}{\overset{|}{Si}}O}}\!\right)_{\!l}\!\!\left(\!\underset{R_{10}}{\overset{R_9}{\underset{|}{\overset{|}{Si}}O}}\!\right)_{\!n}\!\!-\!\!*, \quad *\!-\!\!\left(\!\underset{R_6}{\overset{R_5}{\underset{|}{\overset{|}{Si}}O}}\!\right)_{\!l}\!\!\left(\!\underset{R_8}{\overset{R_7}{\underset{|}{\overset{|}{Si}}O}}\!\right)_{\!m}\!\!\left(\!\underset{R_{10}}{\overset{R_9}{\underset{|}{\overset{|}{Si}}O}}\!\right)_{\!n}\!\!-\!\!*$$

in Chemical Formula 2-1, l, m and n are each independently an integer selected from 1 to 200, $R_5$ is selected from hydrogen or $$*\!-\!\!\overset{L_1}{\diagup}\!\!\left(\!O\diagdown\diagup\!\right)_{\!q}\!\!\overset{O}{\diagdown}\!R_{11},$$

$L_1$ is $(C_1-C_4)$alkylene, $R_{11}$ is hydrogen or (C1-C3)alkyl, q is an integer of 1 to 20, and $R_6$ is selected from $(C_1-C_{10})$alkyl, $R_7$ and $R_8$ are each independently selected from $(C_1-C_{10})$alkyl, $R_9$ and $R_{10}$ are each independently $(C_1-C_{10})$alkyl or fluorine-substituted $(C_1-C_{10})$ alkyl, and at least one of $R_9$ and $R_{10}$ is fluorine-substituted $(C_1-C_{10})$ alkyl.

More specifically, in Chemical Formula 2-1, l, m and n are each independently an integer selected from 5 to 150, $R_5$ is hydrogen or $$*\!\diagup\!\diagdown\!\diagup\!\left(\!O\diagdown\diagup\!\right)_{\!q}\!\!\overset{O}{\diagdown}\!\diagup,$$

q is an integer of 5 to 15, $R_6$ is methyl, $R_7$ and $R_8$ are methyl, $R_9$ is $$*\!\diagup\!\diagdown\!\!\diagup\!CF_3,$$

and $R_{10}$ is methyl.

In addition, $R_1$, $R_2$, $R_3$ and $R_4$ may be methyl groups, and $X_1$ and $X_2$ may be each independently a substituent represented by Chemical Formula 3-1 below:

[Chemical Formula 3-1]

$$*\!-\!(CH_2)_{\!o}\!-\!\!\!\!\bigcirc\!\!\!\!-\!(CH_2)_{\!p}\!-\!O\!-\!\underset{\underset{O}{\|}}{C}\!-\!\underset{R_{11}}{C}\!=\!CH_2$$

in Chemical Formula 3-1, $R_{11}$ is hydrogen or methyl, and o and p are each independently an integer selected from 1 to 5.

In another general aspect, there is provided a polymeric composition for preparing a silicone hydrogel lens including the siloxane monomer as described above to be easily releasable from a component of a mold.

More specifically, the polymeric composition may include the siloxane monomer, a reactive monomer, a cross-linking agent, and an initiator.

The polymeric composition may include 5 to 60 wt % of the siloxane monomer and have a viscosity of 10 to 20,000 cP measured at 25° C.

More specifically, the polymeric composition may include 5 to 60 wt % of the siloxane monomer, 35 to 90 wt % of the reactive monomer, 0.005 to 5 wt % of the cross-linking agent, and 0.005 to 2 wt % of the initiator.

The reactive monomer may be any one or a mixture of two or more selected from the group consisting of a hydrophilic acrylic monomer and a hydrophilic silicone acrylic monomer.

In another general aspect, there is provided a silicone hydrogel lens including a copolymer obtained by polymerizing the polymeric composition as described above.

The hydrophilic acrylic monomer may be any one or a mixture of two or more selected from the group consisting of $C_1-C_{15}$ hydroxyalkyl methacrylate substituted with 1 to 3 hydroxy groups, $C_1-C_{15}$ hydroxyalkyl acrylate substituted with 1 to 3 hydroxyl groups, acrylamide, vinyl pyrrolidone, glycerol methacrylate, acrylic acid, and methacrylic acid, and the hydrophilic silicone acrylic monomer may be any one or a mixture of two or more selected from the group consisting of tris(3-methacryloxypropyl)silane, 2-(trimethylsilyloxy)ethyl methacrylate, 3-tris(trimethylsilyloxy)silylpropyl methacrylate, 3-methacryloxypropyltris(trimethylsilyl)silane (MPTS), 3-methacryloxy-2-(hydroxypropyloxy) propylbis(trimethylsiloxy)methylsilane, and 4-methacryloxybutyl-terminated polydimethylsiloxane.

In still another general aspect, there is provided a silicone hydrogel lens having a separation yield according to Equation 1 below of 80% or more when the polymeric composition is cured in a mold to prepare a lens and is then sucked with a suction having the degree of vacuum of 5 to 50 mmHg:

Separation yield=(number of lenses separating from mold after suction/total number of lenses cured in mold)×100     [Equation 1]

In still another general aspect, there is provided a silicone hydrogel lens including a siloxane monomer unit as described above and having a separation yield according to Equation 1 below of 80% or more when sucked with a suction having the degree of vacuum of 5 to 50 mmHg:

Separation yield=(number of lenses separating from mold after suction/total number of lenses cured in mold)×100     [Equation 1]

In still another general aspect, there is provided a method for improving releasability of a silicone hydrogel lens from a component of a mold, characterized in that a siloxane monomer unit represented by Chemical Formula 1 below is included in the silicone hydrogel lens to have excellent releasability when peeled off from a polypropylene mold:

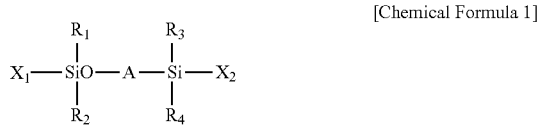

[Chemical Formula 1]

in Chemical Formula 1, $R_1$, $R_2$, $R_3$ and $R_4$ are each independently selected from hydrogen, ($C_1$-$C_{10}$)alkyl, and A is a linking group represented by Chemical Formula 2 below, and $X_1$ and $X_2$ are each independently a substituent represented by Chemical Formula 3 below:

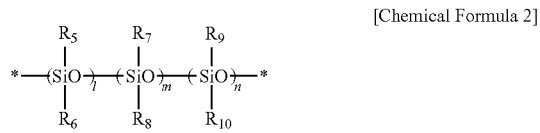

[Chemical Formula 2]

in Chemical Formula 2, l, m and n are each independently an integer selected from 0 to 200, and l+m+n>0, $R_5$, $R_6$, $R_7$, $R_8$, $R_9$ and $R_{10}$ are each independently selected from hydrogen, ($C_1$-$C_{10}$) alkyl, fluorine-substituted ($C_1$-$C_{10}$) alkyl, and

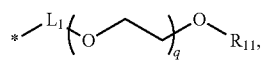

$L_1$ is ($C_1$-$C_4$)alkylene, $R_{11}$ is hydrogen or ($C_1$-$C_3$)alkyl, and q is an integer of 1 to 20,

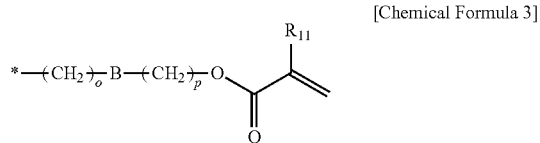

[Chemical Formula 3]

in Chemical Formula 3, o and p are each independently an integer selected from 1 to 10, B is ($C_6$-$C_{10}$)arylene, and $R_{11}$ is hydrogen or a methyl group.

Advantageous Effects

According to the present invention, the silicone hydrogel lens cured by introducing an aromatic structure such as a phenyl group into a siloxane monomer which is a silicone raw material of a silicone hydrogel may be prepared to have intensity and reduced stickiness to be effectively released from a mold, and thus it is possible to increase a separation yield of the lens and to simplify the process.

Further, the silicone hydrogel lens may have not only excellent releasability, but also water content and oxygen permeability coefficient which are the same as or similar to those of the existing silicone hydrogel lenses.

Best Mode

Hereinafter, the present invention is described in more detail with reference to Examples. It should be understood, however, that the following specific exemplary embodiments or Examples are only illustrative of the present invention in detail, and the present invention is not limited thereto, and may be implemented in various forms.

In addition, unless defined otherwise, all technical and scientific terms used herein have the same meanings as commonly understood by one of those skilled in the art to which the present disclosure pertains. Terms used herein have purposes of describing particular exemplary embodiments only and are not intended to limit the present invention.

The following terms used in accordance with the present invention are defined to have the following meanings, unless otherwise stated explicitly. Other terms are defined in the text or in some sense, are defined consistent with these uses.

The term "adhesion" means the degree of stickiness caused when a silicone hydrogel lens is separated from a component of a mold. In the present invention, polypropylene may be used as a material for the component of the mold, and the adhesion may be evaluated by peeling force generated when releasing the lens from a polypropylene mold.

The term "excellent releasability" means that the lens is loosely attached to the mold and is able to be easily removed by pushing the lens with a swab. In addition, it means that the lens attached to the component of the mold between the processes is sucked by a suction of a separator, and thus the lens is easily separated from the component of the mold.

The term "release" refers to a process of separating two mold members, such as a male mold member and a female mold member, of a mold containing a polymerized product or apparatus.

In the case of a lens such as a contact lens, the release refers to separation of two mold members which are joiners together to define a lens-shaped cavity.

The term "hydrogel" refers to a polymer material that is swellable in water or swollen by water, typically a network or matrix of polymer chains. The matrix may be cross-linked or may not be cross-linked. Thus, hydrogel refers to a polymer material including contact lenses that are water-swellable or water-swollen.

The term 'polymeric composition' is understood to have the same meaning as 'polymeric mixture', and may also be understood as being prepolymerized or precured suitably for polymerization. For example, in the case of a field of a lens, the polymeric composition may be a lens precursor composition. The polymeric composition may also be referred to as a mixture of monomers.

Preferably, the polymeric composition or the lens precursor composition is not polymerized prior to curing or polymerization of the mixture or composition. However, the polymeric composition or the lens precursor composition may be partially polymerized before being subjected to a curing process.

The term 'mold component (mold)' may be made of a material commonly used in the field, and is not limited, but the mold may be made of a non-polar resin, and may be made of, for example, polypropylene.

The term 'monomer' refers to a compound that is polymerizable regardless of the molecular weight of the compound. Thus, the monomer may be a low molecular weight monomer or a macromer as described below.

The term "low molecular weight monomer" refers to a polymeric compound having a relatively low molecular weight, for example, an average molecular weight of less than 1,000 g/mol. In one example, the low molecular weight monomer may include a single unit of a molecule containing one or more functional groups capable of being combined together with other molecules having the same structure as or different structure from the low molecular weight monomer to form a polymer.

The term 'macromer' refers to a medium or high molecular weight compound or polymer that may contain one or more functional groups that are able to be polymerized or further polymerized. For example, the macromer may be a compound or polymer having an average molecular weight of about 1,000 to 50,000 g/mol.

The term 'copolymer' refers to a material formed by polymerization of one or more monomers, macromers, or mixtures thereof.

The present invention provides a siloxane monomer used for preparation of a silicone hydrogel lens which is easily releasable from a component of a mold. An embodiment of the siloxane monomer is represented by Chemical Formula 1 below:

[Chemical Formula 1]

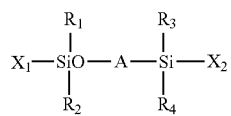

in Chemical Formula 1, $R_1$, $R_2$, $R_3$ and $R_4$ are each independently selected from hydrogen, $(C_1-C_{10})$ alkyl, and A is a linking group represented by Chemical Formula 2 below, and $X_1$ and $X_2$ are each independently a substituent represented by Chemical Formula 3 below:

[Chemical Formula 2]

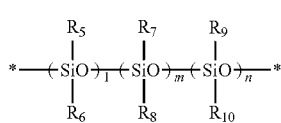

in Chemical Formula 2, l, m and n are each independently an integer selected from 0 to 200, and l+m+n>0, $R_5$, $R_6$, $R_7$, $R_8$, $R_9$ and $R_{10}$ are each independently selected from hydrogen, $(C_1-C_{10})$ alkyl, fluorine-substituted $(C_1-C_{10})$ alkyl, and

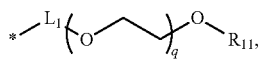

$L_1$ is $(C_1-C_4)$ alkylene, $R_{11}$ is hydrogen or $(C_1-C_3)$ alkyl, and q is an integer of 1 to 20,

[Chemical Formula 3]

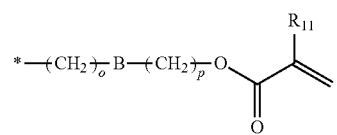

in Chemical Formula 3, o and p are each independently an integer selected from 1 to 10, B is $(C_6-C_{10})$ arylene, and $R_{11}$ is hydrogen or a methyl group.

The siloxane monomer represented by Chemical Formula 1 used in the present invention includes $(C_6-C_{10})$ arylene as shown in Chemical Formula 3 to have improved releasability from a desired mold component.

The siloxane monomer represented by Chemical Formula 1 is not limited, but may have an average molecular weight of 1,000 to 50,000 g/mol, more specifically 1,000 to 30,000 g/mol, but is not limited thereto.

The 'alkyl' represents a hydrocarbon chain having 1 to 10 carbon atoms. The hydrocarbon chain is preferred, but not necessarily saturated, and may be branched or straight chain. Exemplary alkyl groups include methyl, ethyl, propyl, butyl, pentyl, 1-methylbutyl, 1-ethylpropyl, 3-methylpentyl, and the like.

The 'fluorine-substituted alkyl' means that fluorine is substituted at a hydrogen position of the alkyl.

In addition, in the present invention, l, m, and n may be a block structure, and the block structure includes an irregular structure.

In Chemical Formula 1 above, l+m+n>0 means that any one of l, m and n is not necessarily 0, and more preferably selected from the following Chemical Formula 2-1:

[Chemical Formula 2-1]

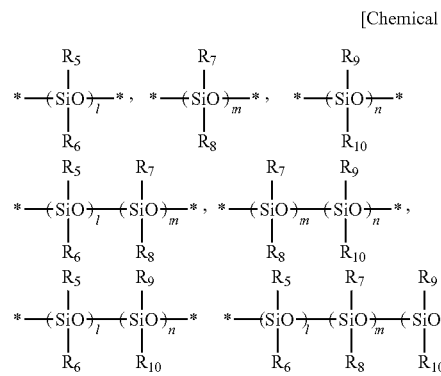

in Chemical Formula 2-1, l, m and n are each independently an integer selected from 1 to 200, $R_5$ is selected from hydrogen or

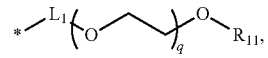

$L_1$ is $(C_1-C_4)$ alkylene, $R_{11}$ is hydrogen or $(C_1-C_3)$ alkyl, q is an integer of 1 to 20, and $R_6$ is selected from $(C_1-C_{10})$ alkyl, $R_7$ and $R_8$ are each independently selected from $(C_1-C_{10})$ alkyl, and $R_9$ and $R_{10}$ are each independently $(C_1-C_{10})$ alkyl or fluorine-substituted $(C_1-C_{10})$ alkyl, and at least one of $R_9$ and $R_{10}$ is fluorine-substituted $(C_1-C_{10})$ alkyl.

In Chemical Formula 2-1, more preferably, in Chemical Formula 2-1, l, m and n are each independently an integer selected from 5 to 150, $R_5$ is hydrogen or

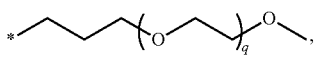

q is an integer of 10 to 15, $R_6$ is methyl,
$R_7$ and $R_8$ are methyl, $R_9$ is

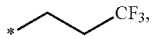

and $R_{10}$ is methyl.

In Chemical Formula 2-1 above, $R_5$ is more preferably

q is an integer of 10 to 15, $R_6$ is methyl, l is an integer of 5 to 15, $R_7$ and $R_8$ are methyl, m is an integer selected from 100 to 150, $R_9$ is

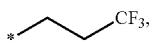

$R_{10}$ is methyl, and n is an integer selected from 5 to 15.

In an embodiment of the present invention, the

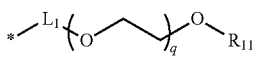

group may serve to impart hydrophilicity to the hydrophobic siloxane monomer to improve wettability of the lens, and more specifically, may be

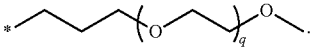

In addition, the

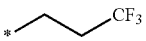

group may serve to impart coloration resistance.

In addition, in an embodiment of the present invention, $R_1$, $R_2$, $R_3$ and $R_4$ in Chemical Formula 1 may be methyl groups, it is preferred that $X_1$ and $X_2$ are each independently a substituent represented by Chemical Formula 3-1 below:

[Chemical Formula 3-1]

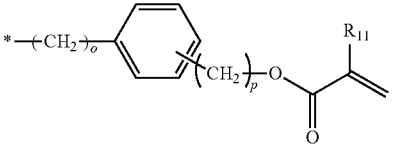

in Chemical Formula 3-1, $R_{11}$ is hydrogen or methyl, and o and p are each independently an integer selected from 1 to 5.

More specifically, in Chemical Formula 3-1, o and p are preferably an integer of 1 to 2.

The present inventors found that the releasability is further improved by containing arylene, more specifically phenylene, as in Chemical Formula 3-1 above, and completed the present invention.

In an embodiment of the present invention, the Chemical Formula 1 may be specifically selected from the following compounds. The following compounds 1 to 22 are only examples which specifically exemplify Chemical Formula 1 of the present invention, but the present invention is not limited thereto:

[Compound 1]

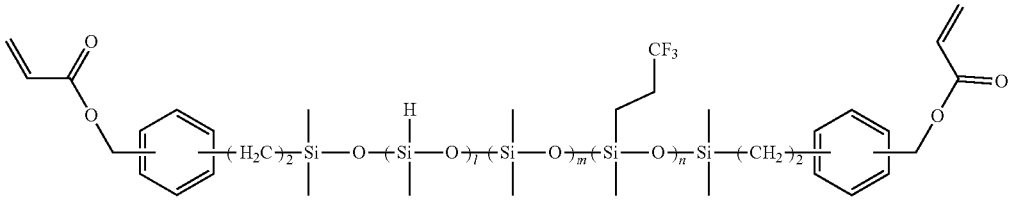

l, m and n are each independently an integer selected from 1 to 200,

[Compound 2]

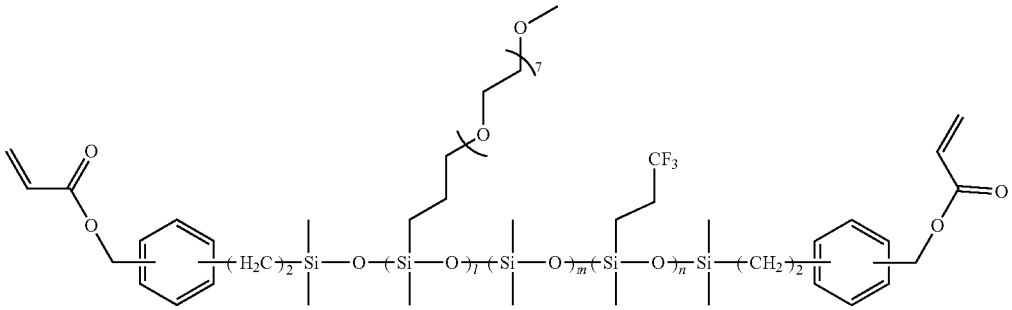

l, m and n are each independently an integer selected from 1 to 200,
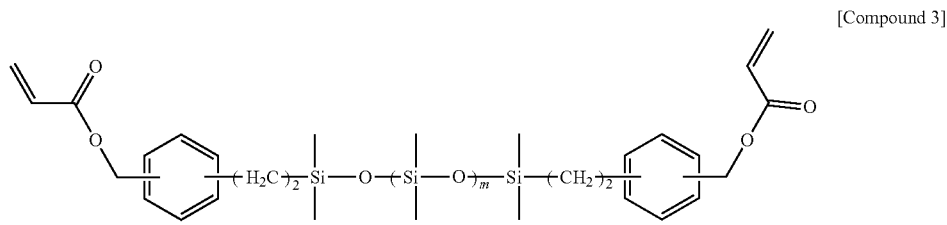
[Compound 3]
m is an integer selected from 1 to 200,
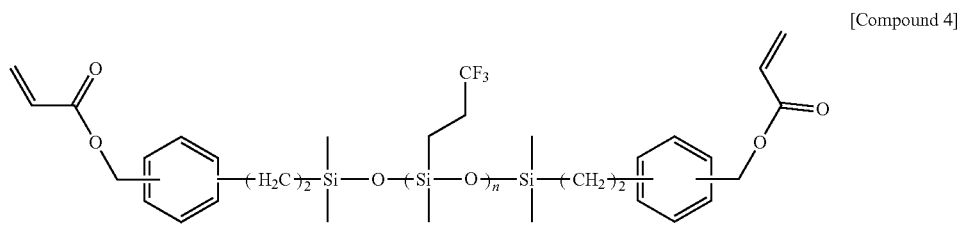
[Compound 4]
n is an integer selected from 1 to 200,
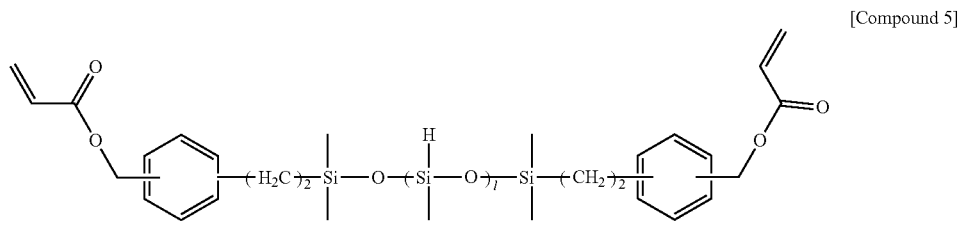
[Compound 5]
l is an integer selected from 1 to 200,
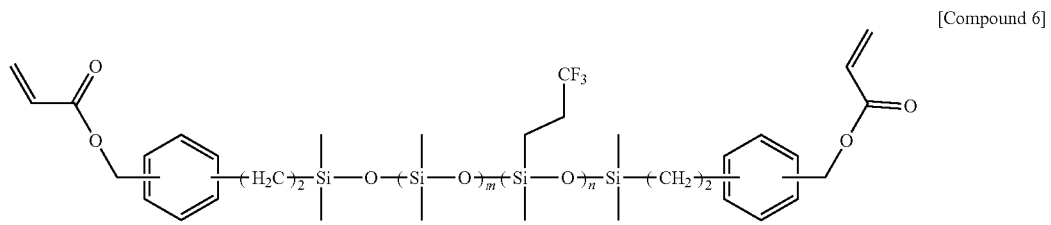
[Compound 6]
m and n are each independently an integer selected from 1 to 200,
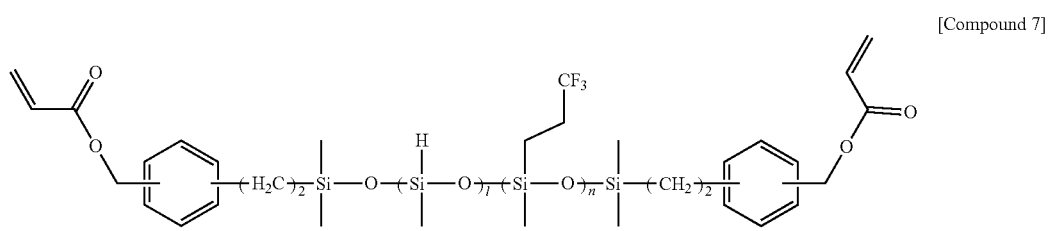
[Compound 7]

l and n are each independently an integer selected from 1 to 200,
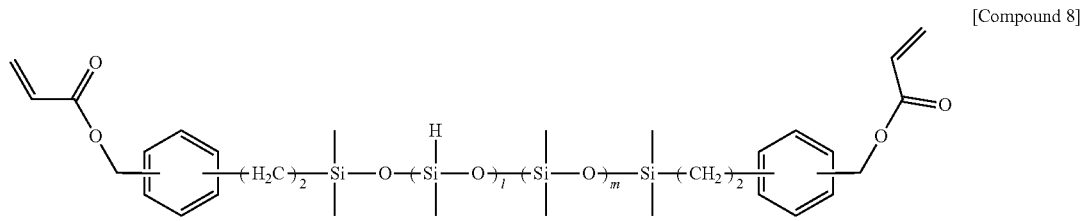
[Compound 8]
l and m are each independently an integer selected from 1 to 200,
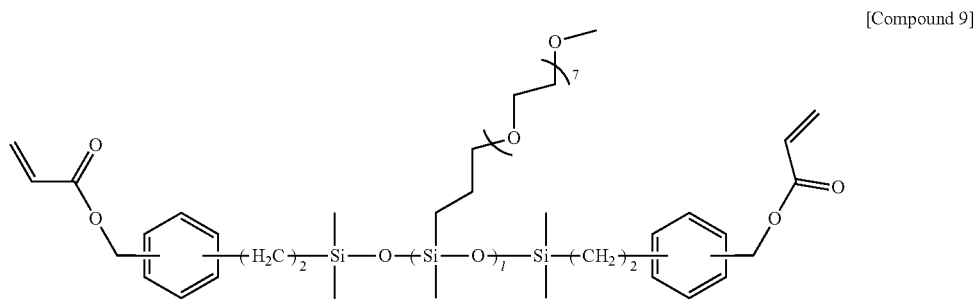
[Compound 9]
l is an integer selected from 1 to 200,
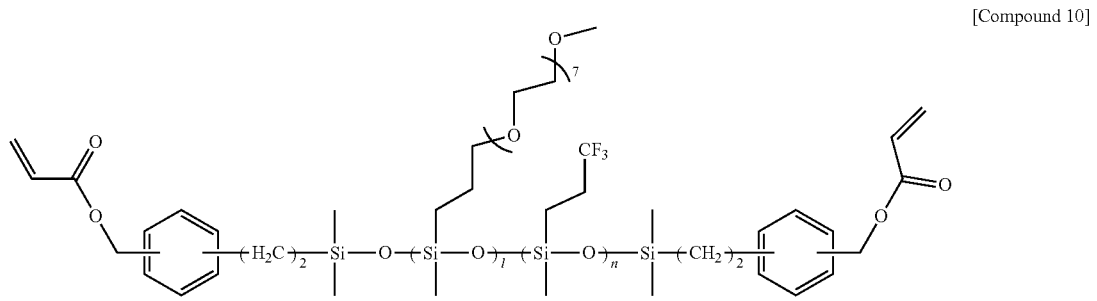
[Compound 10]
l and n are each independently an integer selected from 1 to 200,
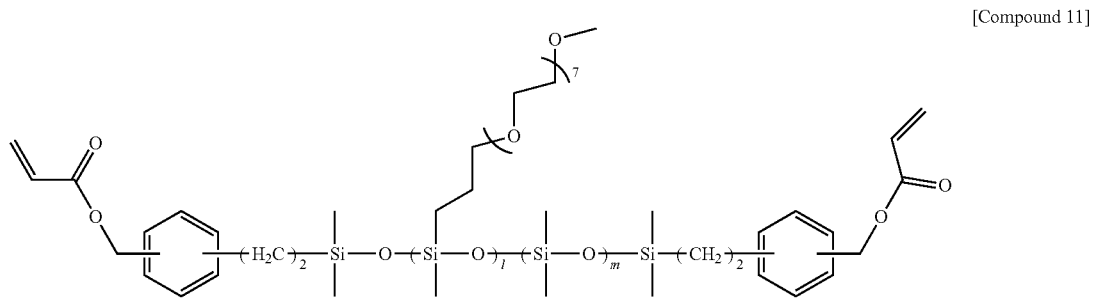
[Compound 11]

l and m are each independently an integer selected from 1 to 200,
[Compound 12]
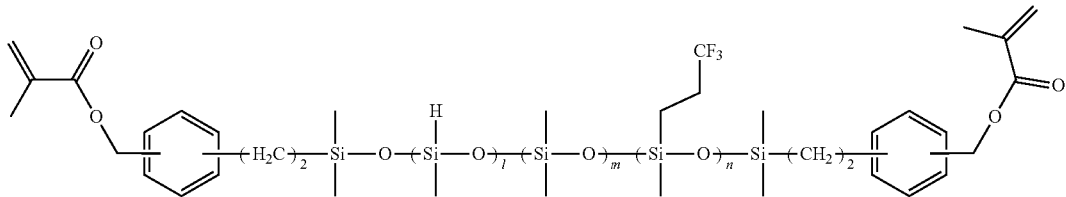
l, m and n are each independently an integer selected from 1 to 200,
[Compound 13]
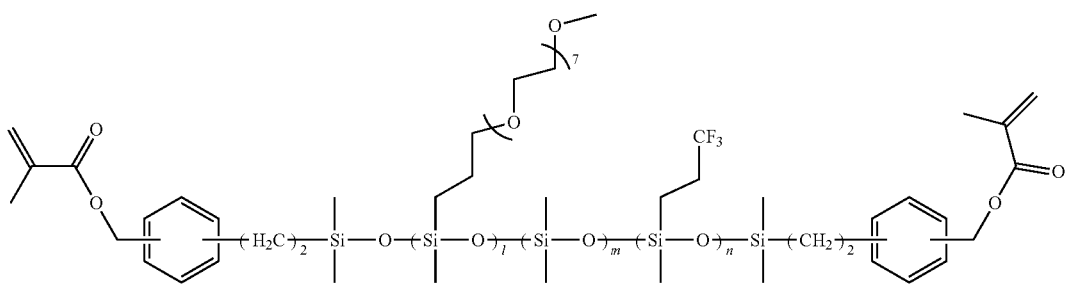
l, m and n are each independently an integer selected from 1 to 200,
[Compound 14]
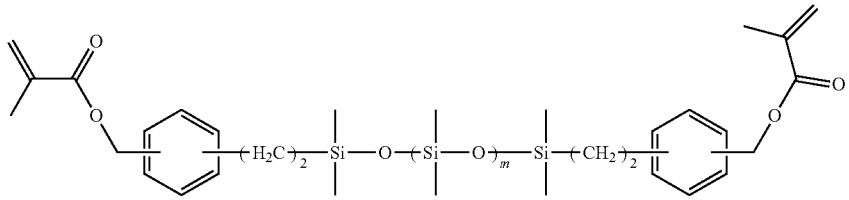
m is an integer selected from 1 to 200,
[Compound 15]
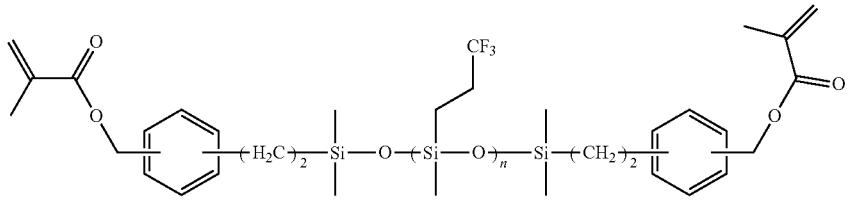
n is an integer selected from 1 to 200,
[Compound 16]
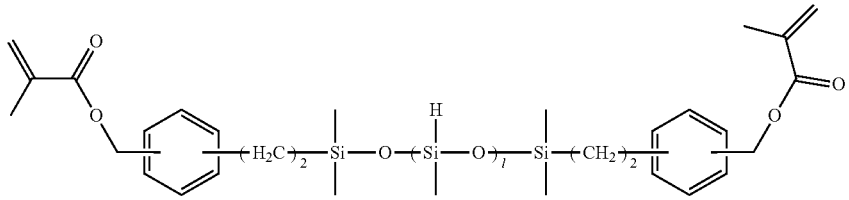
l is an integer selected from 1 to 200,

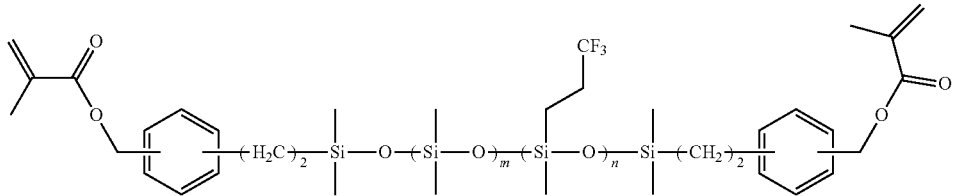
[Compound 17]
m and n are each independently an integer selected from 1 to 200,
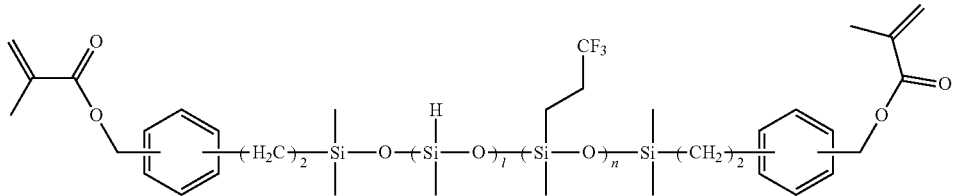
[Compound 18]
l and n are each independently an integer selected from 1 to 200,
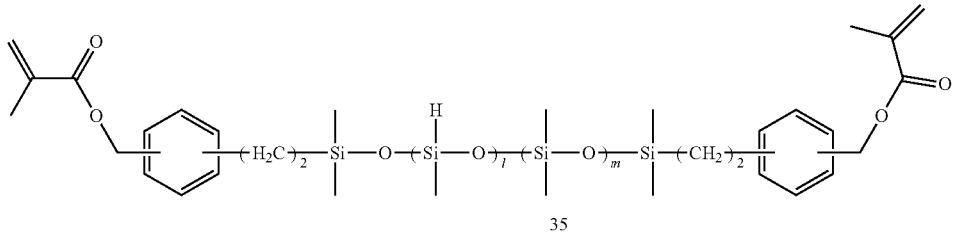
[Compound 19]
l and m are each independently an integer selected from 1 to 200,
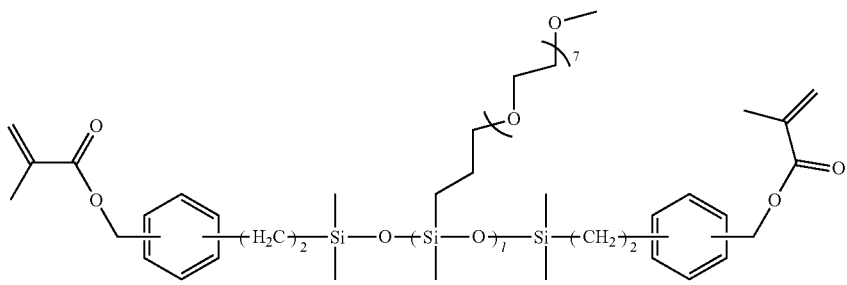
[Compound 20]
l is an integer selected from 1 to 200,
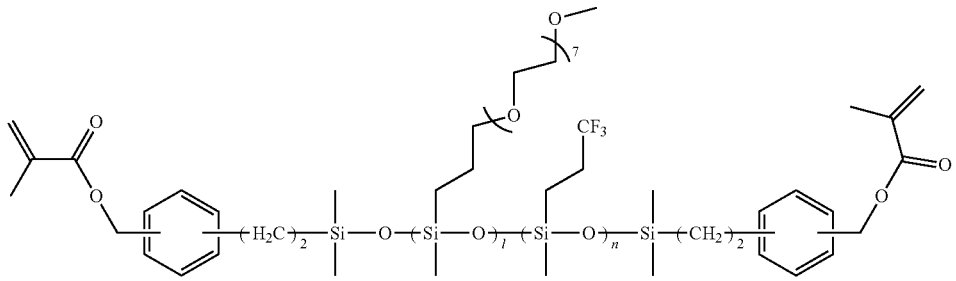
[Compound 21]

l and n are each independently an integer selected from 1 to 200, and

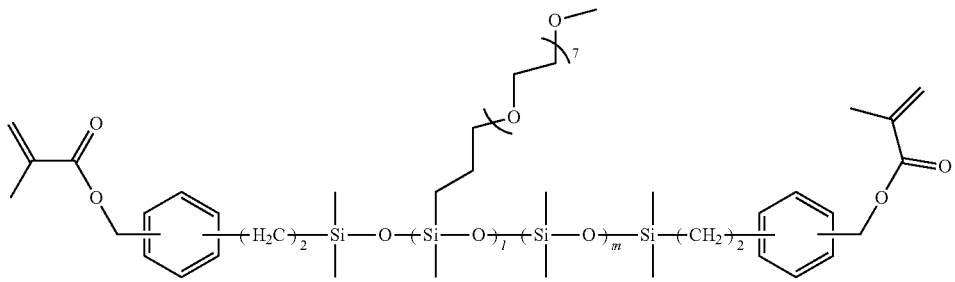

[Compound 22]

l and m are each independently an integer selected from 1 to 200.

Further, in an embodiment of the present invention, the polymeric composition for preparing the silicone hydrogel lens includes the siloxane monomer. The composition is not limited as long as it is a composition commonly used in a silicone hydrogel lens including the siloxane monomer.

More specifically, an embodiment of the polymeric composition of the present invention may include the siloxane monomer and one or two or more reactive monomers, and may include a cross-linking agent, an initiator, and the like.

The polymeric composition may have a viscosity of 10 to 20,000 cP (centipoise) measured at 25° C., and within this range, the polymeric composition has excellent productivity when injected into a mold component, but the present invention is not limited thereto. More preferably, the viscosity may be 100 to 15000 cP.

Here, a content of the siloxane monomer may be 5 to 60 wt % in the polymeric composition, and within this range, desired releasability may be achieved, but the present invention is not limited thereto. Specifically, the content may be 10 to 60 wt %, more specifically 30 to 50 wt %, but is not limited thereto.

In an embodiment of the polymeric composition of the present invention, the reactive monomer is a monomer having a substituent capable of reacting with the siloxane monomer, and may be a hydrophilic monomer. Here, the hydrophilic monomer is not particularly limited, and may be for example, a hydrophilic acrylic monomer, hydrophilic silicone acrylic monomer, and the like, but the present invention is not limited thereto.

The hydrophilic acrylic monomer may be specifically, for example, one or two or more selected from the group consisting of $C_1$-$C_{15}$ hydroxyalkyl methacrylate substituted with 1 to 3 hydroxy groups, $C_1$-$C_{15}$ hydroxyalkyl acrylate substituted with 1 to 3 hydroxyl groups, acrylamide, vinyl pyrrolidone, glycerol methacrylate, acrylic acid, and methacrylic acid, and the like. More specifically, the hydrophilic acrylic monomer may be, for example, one or two or more selected from the group consisting of 2-hydroxyethyl methacrylate (HEMA), N,N-dimethyl acrylamide (DMA), N-vinyl pyrrolidone (NVP), glycerol monomethacrylate (GMMA), and methacrylic acid (MAA), and the like.

More specifically, the hydrophilic silicone acrylic monomer may be, for example, one or two or more selected from the group consisting of tris(3-methacryloxypropyl)silane, 2-(trimethylsilyloxy)ethyl methacrylate, 3-tris(trimethylsilyloxy)silylpropyl methacrylate, 3-methacryloxypropyltris(trimethylsilyl)silane (MPTS), 3-methacryloxy-2-(hydroxypropyloxy)propylbis(trimethylsiloxy)methylsilane, and 4-methacryloxybutyl-terminated polydimethylsiloxane, and the like.

In addition, the hydrophobic monomer may be used together with the hydrophilic monomer if necessary. The hydrophobic monomer is not particularly limited, and may be any hydrophobic monomer that is conventionally used in the art. For example, a hydrophobic acrylic monomer, or the like, may be used.

The hydrophobic acrylic monomer may include an alkyl acrylate monomer and an alkyl methacrylate monomer, and the like. More specifically, for example, the hydrophobic acrylic monomer includes any one or two or more selected from methyl acrylatemethyl methacrylate, ethyl acrylate, ethyl methacrylate, n-propyl acrylate, n-propyl methacrylate, n-butyl acrylate, n-butyl methacrylate, stearyl acylate, stearyl methacrylate, and the like. Further, a monomer having a high glass transition temperature ($T_g$), for example, any one or a mixture of two or more selected from cyclohexyl methacrylate, tert-butyl methacrylate, and isobornyl methacrylate, and the like, may be used to enhance mechanical properties.

The reactive monomer is preferably included in 35 to 90 wt % in the polymeric composition, but is not limited thereto. More specifically, a content of the reactive monomer may be from 40 to 70 wt %. Within this range, physical properties due to the reactive monomer to be added may be expressed together while achieving desired releasability.

In an embodiment of the polymeric composition of the present invention, the cross-linking agent may be one or two or more selected from the group consisting of ethylene glycol dimethacrylate (EGDMA), diethylene glycol methacrylate (DGMA), divinylbenzene, trimethylolpropane trimethyacrylate (TMPTMA), and the like, but the present invention is not limited thereto. In addition, the cross-linking agent may have a content of 0.005 to 5 wt %, more specifically 0.010 to 3 wt % in the polymeric composition.

In an embodiment of the polymeric composition of the present invention, the initiator is used for polymerization, and may be used without limitation as long as it is an initiator commonly used in the field. For example, a thermal initiator, a photoinitiator, and the like, may be used.

Specifically, the thermal initiator may be any one or a mixture of two or more selected from peroxide-based compounds such as benzoyl peroxide, lauryl peroxide, 2,5-dimethyl-2,5-di-(2-ethylhexanoylperoxy)hexane, and the like; azo compounds such as azobisisobutyronitrile (AIBN), and the like; and carbonate compounds such as isopropyl percarbonate, and the like.

Specifically, as the photoinitiator, any one or a mixture of two or more selected from aromatic alpha-hydroxy ketone, alkoxyoxybenzoin, acetophenone, acylphosphine oxide, tertiary amine, and diketone may be used. More specifically, for example, 1-hydroxycyclohexyl phenyl ketone, 2-hydroxy-2-methyl-1-phenyl-propan-1-one, bis(2,6-dimethoxybenzoyl)-2,4,4-trimethylpentylphosphine oxide (DM-BAPO), bis(2,4,6-trimethylbenzoyl)-phenylphosphine oxide (Irgacure 819), 2,4,6-trimethylbenzyldiphenylphosphine oxide, 2,4,6-trimethylbenzoyl diphenylphosphine oxide, benzoin methyl ester, and a combination of camphorquinone and ethyl 4-(N,N-dimethylamino)benzoate, and the like, may be used, but the present invention is not limited thereto.

The initiator may have a content of 0.005 to 2.000 wt %, more specifically 0.010 to 1.500 wt %, in the polymeric composition, but is not limited thereto.

In an embodiment of the polymeric composition of the present invention, the polymeric composition may further include an additive as required, wherein the additive may include a colorant, an ultraviolet blocking agent, a UV blocker, and the like. For example, the colorant may be particularly helpful in visualizing contact lenses in an aqueous liquid such as a packaging solution, and the like. The additive preferably has a content of 0.010 to 2 wt %, more preferably 0.05 to 1.5 wt %, in the polymeric composition, but is not limited thereto.

Another embodiment of the present invention is to provide a silicone hydrogel lens prepared from the polymeric composition. Specifically, the silicone hydrogel lens is a silicone hydrogel lens including a copolymer formed by polymerizing the siloxane monomer and at least one reactive monomer to thereby be easily releasable from a component of a mold.

Specifically, the silicone hydrogel lens is a silicone hydrogel lens having a separation yield according to Equation 1 below of 80% or more when the polymeric composition including the siloxane monomer represented by Chemical Formula 1 above, the reactive monomer, the cross-linking agent, and the initiator is cured in a mold to prepare a lens and is then sucked with a suction having the degree of vacuum of 5 to 50 mmHg:

Separation yield =(number of lenses separating from mold after suction/total number of lenses cured in mold)×100   [Equation 1]

When the separation yield is less than 80%, a separate organic solvent or the like is required to be used to separate the lens from the mold.

According to the present invention, it is possible to prepare a lens having the separation yield of 80% or more, and more preferably 90% or more, from the mold without using a separate organic solvent by using the siloxane monomer represented by Chemical Formula 1 above.

In addition, another embodiment of the present invention is to provide a method for improving releasability of a silicone hydrogel lens from a component of a mold, characterized in that a siloxane monomer represented by Chemical Formula 1 below is included in the silicone hydrogel lens to have excellent releasability when peeled off from a polypropylene mold:

[Chemical Formula 1]

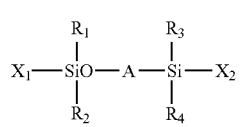

in Chemical Formula 1,
$R_1$, $R_2$, $R_3$ and $R_4$ are each independently selected from hydrogen, $(C_1-C_{10})$alkyl, and
A is a linking group represented by Chemical Formula 2 below, and $X_1$ and $X_2$ are each independently a substituent represented by Chemical Formula 3 below:

[Chemical Formula 2]

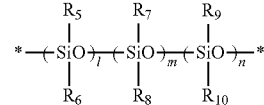

in Chemical Formula 2, l, m and n are each independently an integer selected from 0 to 200, and l+m+n>0,
$R_5$, $R_6$, $R_7$, $R_8$, $R_9$ and $R_{10}$ are each independently selected from hydrogen, $(C_1-C_{10})$ alkyl, fluorine-substituted $(C_1-C_{10})$ alkyl, and

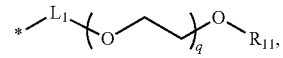

$L_1$ is $(C_1-C_4)$ alkylene, $R_{11}$ is hydrogen or $(C_1-C_3)$ alkyl, and q is an integer of 1 to 20,

[Chemical Formula 3]

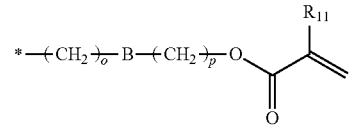

in Chemical Formula 3, o and p are each independently an integer selected from 1 to 10, B is $(C_6-C_{10})$ arylene, and $R_{11}$ is hydrogen or a methyl group.

Hereinafter, the present invention is described with reference to Examples and Comparative Examples, but the present invention is not limited thereto.

Physical properties of the lens were measured by the following methods.

(1) Releasability

A lens was prepared by curing a composition for preparing a silicone hydrogel lens in a polypropylene mold, and the releasability was then evaluated with a yield in which the lens was separated from a component of a mold when sucking the lens with a suction of a separator. The degree of vacuum of the suction was 20 mmHg. The separation yield was calculated by the following Equation 1:

Separation yield=(number of lenses separating from mold after suction/total number of lenses cured in mold)×100   [Equation 1]

Excellent releasability: Means that the separation yield is 80% or more when 100 lenses attached to the component of the mold are separated by a suction.

Normal releasability: Means that the separation yield is 30% or more to less than 80% when 100 lenses attached to the component of the mold are separated by a suction.

Poor releasability: Means that the separation yield is less than 30% when 100 lenses attached to the component of the mold are separated by a suction.

(2) Water Content

Water content (%) was evaluated by measuring a weight of a dry contact lens and a weight of a swollen contact lens after being immersed in a 0.9 wt % sodium chloride (NaCl) aqueous solution for 24 hours, using the following Equation.

In other words, the water content was evaluated as a ratio of the weight ($W_{swell}$) of the swollen contact lens to the weight ($W_{dry}$) of the dry contact lens.

Water content (%)=($W_{swell}$-$W_{dry}$) $W_{dry}$×100

(3) Oxygen Permeability Coefficient (Dk Value)

In order to determine the oxygen permeability (Dk), a specimen was immersed in PBS solution at room temperature for 24 hours, and stored at 35° C.±0.5° C., which was a temperature of the eye, for at least 2 hours. In addition, the specimen was placed in an incubator, and the oxygen permeability (Dk) was measured by using an oxygen permeability measurement apparatus [Model 201T, Rehder Development Co., West Lafayette, U.S.A.] in a lens moisture saturation state under an atmosphere of a temperature of 35° C.±0.5° C. and a humidity of 98%.

(4) Weight Average Molecular Weight

The weight average molecular weight was measured by using gel permeation chromatography (GPC) equipment manufactured by Waters Corporation. The equipment includes a mobile pump (1515 Binary Pump), a column heater (1500 Series), a detector (2414 R.I. Detector) and an injector (2707 automatic injector). KF-802, KF-802.5 and KF-803 manufactured by Shodex were used as the analytical column, and polystyrene (PS) SL-105 STD was used as a standard material. HPLC grade tetrahydrofuran (THF) was used as a mobile phase solvent, a column heater temperature was 40° C., and a flow rate for the mobile phase solvent was 1.0 mL/min. The siloxane monomer prepared for sample analysis was dissolved in the mobile phase solvent, tetrahydrofuran (THF), and injected into GPC equipment to measure the weight average molecular weight.

(5) Viscosity

The viscosity was measured using a LVDV-2T viscometer manufactured by Brookfield. The siloxane monomer was placed in a container at 25° C. at room temperature, and the viscosity was measured by rotating the container at a speed of 10 rpm using a spindle.

EXAMPLE 1

1) Synthesis of Siloxane Monomer (1) Synthesis of Siloxane Monomer having Si—H: Synthesis Step 1

A mixture of 145.3 g (0.49 mol) of octamethylcyclotetrasiloxane, 21.9 g (0.047 mol) of 1,3,5-trimethyltrifluoropropyl-cyclotrisiloxane, 5.1 g (0.021 mol) of 1,3,5,7-tetramethyl-cyclotetrasiloxane, 7.4 g (0.014 mol) of 1,3-bis ((acryloxymethyl)phenylethyl)tetramethyldisiloxane which is a compound represented by Chemical Formula 4 below, 180 g of chloroform, and 1.50 g of trifluoromethanesulfonic acid was stirred at 25° C. for 48 hours, and then repeatedly washed with purified water until the pH of the mixture became neutral. After the water was separated, chloroform and volatile components were removed under reduced pressure to obtain a transparent viscous liquid. The obtained amount was 131 g (82.3%).

As a result of the analysis, the compound represented by Chemical Formula 1-1 below was synthesized.

The obtained product was analyzed by 400 MHz hydrogen nuclear magnetic resonace, and as a result, Si—CH$_3$ peak at δ0.06 to 0.12 ppm, Si—CH$_2$—CH$_2$—CF$_3$ peak at δ0.70 ppm (t, 20H), Si—CH$_2$—CH$_2$—CF$_3$ peak at δ2.07 ppm (t, 20H), Si—H peak at δ4.70 ppm (s, 6H), Si—CH$_2$—CH$_2$—Ar peak at δ0.55 ppm (t, 4H), Si—CH$_2$—CH$_2$—Ar peak at δ2.71 ppm (t, 4H), Ar—H peak at δ7.55 ppm (m, 8H), Ar—CH$_2$—O peak at δ4.81 ppm (s, 4H), CH=CH$_2$ peak at δ5.60 to 6.15 ppm (dd, 4H), and CH=CH$_2$ peak at δ5.87 ppm (dd, 2H) were confirmed. The viscosity was measured with a viscometer to confirm that the viscosity was 132 cP. The weight average molecular weight was confirmed to be 12,835 g/mol by GPC analysis.

[Chemical Formula 4]

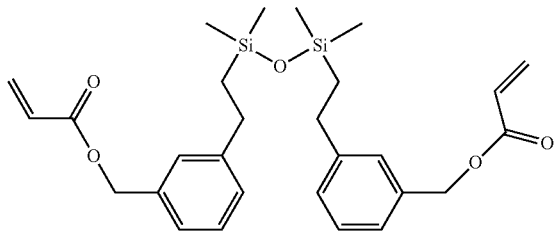

[Chemical Formula 1-1]

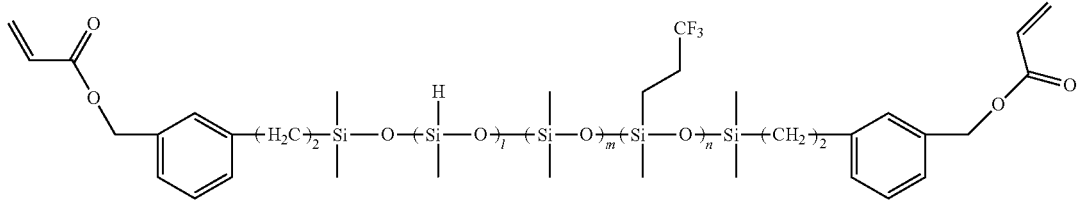

in Chemical Formula above, l=6, m=140, and n=10.

(2) Synthesis of Siloxane Monomer Having PEG Functional Group: Synthesis Step 2

A mixture of 125 g of the above-synthesized siloxane monomer represented by Chemical. Formula 1-1, 31.2 g (0.08 mol) of polyethylene glycol allyl methyl ether represented by Chemical Formula 5 below, 250 g of isopropyl alcohol, and 0.64 ml of a platinum catalyst was placed in a flask equipped with a reflux condenser, and heated under reflux while stirring for 6 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 105.2 g and the yield was 72.1%. As a result of the analysis, a compound represented by Chemical Formula 1-2 was synthesized.

The obtained product was analyzed by 400 MHz hydrogen nuclear magnetic resonance, and as a result, it was confirmed that O—CH₂CH₂— peak was produced at δ3.15 to 3.90 ppm. The viscosity was measured with a viscometer to confirm that the viscosity was 321 cP. The weight average molecular weight was confirmed to be 14,972 g/mol by GPC analysis.

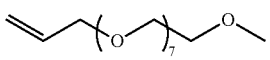

[Chemical Formula 1-2]

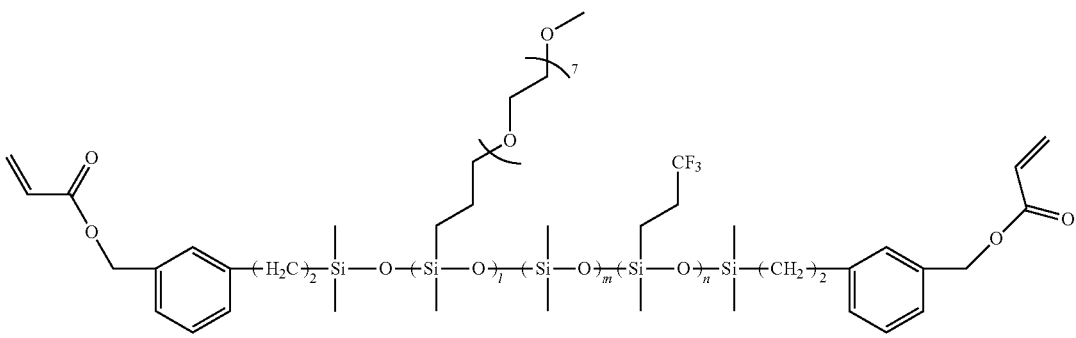

in Chemical Formula above, l=6, m=140, and n=10.

2) Preparation of Polymeric Composition 53.0 g of the siloxane monomer represented by Chemical Formula 1-2 prepared in 1) above, 42.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in ethyl alcohol for 1 hour, immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 2

1) Synthesis of Siloxane Monomer (1) Synthesis of Siloxane Monomer Having Si—H: Synthesis Step 1

A mixture of 145.3 g (0.49 mol) of octamethylcyclotetrasiloxane, 5.1 g (0.021 mol) of 1,3,5,7-tetramethyl-cyclotetrasiloxane, 7.4 g (0.014 mol) of 1,3-bis((acryloxymethyl)phenylethyl)tetramethyldisiloxane, 160 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure

[Chemical Formula 5]

to obtain a transparent viscous liquid. The obtained amount was 121 g, and the yield was 76.7%.

As a result of the analysis, the compound represented by Chemical Formula 1-3 below was synthesized.

The obtained product was analyzed by 100 MHz hydrogen nuclear magnetic resonance, and as a result, Si—CH₃ peak at δ0.06 to 0.12 ppm, Si—H peak at δ4.70 ppm (s, 6H), Si—CH₂—CH₂—Ar peak at δ0.55 ppm (t, 4H), Si—CH₂—CH₂—Ar peak at δ2.71 ppm (t, 4H), Ar—H peak at δ7.55 ppm (m, 8H), Ar—CH₂—O peak at δ4.81 ppm (s, 4H), CH═CH₂ peak at δ5.60 to 6.15 ppm (dd, 4H), and —CH═CH₂ peak at δ5.87 ppm (dd, 2H) were confirmed. The viscosity was measured with a viscometer to confirm that the viscosity was 111 cP. The weight average molecular weight was confirmed to be 11,270 g/mol by GPC analysis.

[Chemical Formula 1-3]

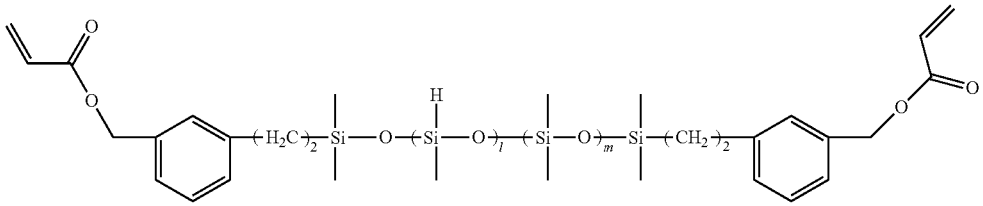

in Chemical Formula above, l=6, and m=140.

(2) Synthesis of Siloxane Monomer Having PEG Functional Group: Synthesis Step 2

A mixture of 100 g of the above-synthesized siloxane monomer represented by Chemical Formula 1-3, 28.4 g (0.08 mol) of polyethylene glycol allyl methyl ether, 200 g of isopropyl alcohol, and 0.51 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 95.2 g and the yield was 80.0%. As a result of the analysis, a compound represented by Chemical Formula 1-4 was synthesized.

The obtained product was analyzed by 400 MHz hydrogen nuclear magnetic resonance, and as a result, it was confirmed that O—$CH_2CH_2$— peak was produced at δ3.15 to 3.90 ppm. The viscosity was measured with a viscometer to confirm that the viscosity was 308 cP. The weight average molecular weight was confirmed to be 13,408 g/mol by GPC analysis.

cyclotrisiloxane, 7.4 g (0.014 mol) of 1,3-bis((acryloxymethyl)phenylethyl)tetramethyldisiloxane, 180 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 135 g, and the yield was 77.3%.

As a result of the analysis, the compound represented by Chemical Formula 1-5 below was synthesized.

[Chemical Formula 1-4]

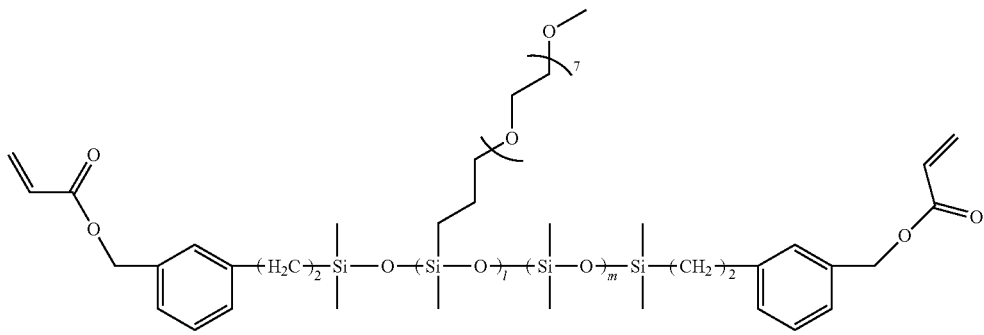

in Chemical Formula above, l=6, and m=140.

2) Preparation of Polymeric Composition 53 g of the siloxane monomer represented by Chemical Formula 1-4 prepared in 1) above, 42.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 3

1) Synthesis of Siloxane Monomer

A mixture of 145 g (0.49 mol) of octamethylcyclotetrasiloxane, 21.9 g (0.047 mol) of 1,3,5-trimethyltrifluoropropyl- The obtained product was analyzed by 400 MHz hydrogen nuclear magnetic resonance, and as a result, Si—$CH_3$ peak at δ0.06 to 0.12 ppm, Si—$CH_2$—$CH_2$—$CF_3$ peak at δ0.70 ppm (t, 20H), Si—$CH_2$—$CH_2$—$CF_3$ peak at δ2.07 ppm (t, 20H), Si—$CH_2$—$CH_2$—Ar peak at δ0.55 ppm (t, 4H), Si—$CH_2$—$CH_2$—Ar peak at δ2.71 ppm (t, 4H), Ar—H peak at δ7.55 ppm (m, 8H), Ar—$CH_2$—O peak at δ4.81 ppm (s, 4H), CH═$CH_2$ peak at δ5.60 to 6.15 ppm (dd, 4H), and CH═$CH_2$ peak at δ5.87 ppm (dd, 2H) were confirmed. The viscosity was measured with a viscometer to confirm that the viscosity was 124 cP. The weight average molecular weight was confirmed to be 12,474 g/mol by GPC analysis.

[Chemical Formula 1-5]

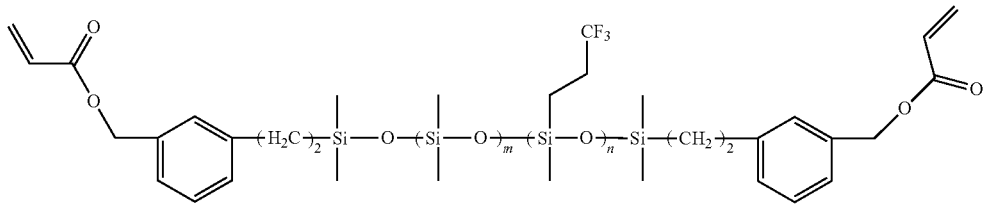

in Chemical Formula above, m=140, and n=10.

2) Preparation of Polymeric Composition 42.0 g of the siloxane monomer represented by Chemical Formula 1-5 prepared in 1) above, 53.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 4

1) Synthesis of Siloxane Monomer

A mixture of 145 g (0.49 mol) of octamethylcyclotetrasiloxane, 21.9 g (0.047 mol) of 1,3,5-trimethyltrifluoropropylcyclotrisiloxane, 5.1 g (0.021 mol) of 1,3,5,7-tetramethylcyclotetrasiloxane, 7.4 g (0.014 mol) of 1,3-bis((acryloxymethyl)phenylethyl)tetramethyldisiloxane, 180 g of chloroform, and 1.50 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 131 g (82.3%).

As a result of the analysis, the compound represented by Chemical Formula 1-6 below was synthesized.

The obtained product was analyzed by 400 MHz hydrogen nuclear magnetic resonance, and as a result, Si—CH$_3$ peak at δ0.06 to 0.12 ppm, Si—CH$_2$—CH$_2$—CF$_3$ peak at δ0.70 ppm (t, 20H), Si—CH$_2$—CH$_2$—CF$_3$ peak at δ2.07 ppm (t, 20H), Si—H peak at δ4.70 ppm (s, 6H), Si—CH$_2$—CH$_2$—Ar peak at δ0.55 ppm (t, 4H), Si—CH$_2$—CH$_2$—Ar peak at δ2.71 ppm (t, 4H), Ar—H peak at δ7.55 ppm (m, 8H), Ar—CH$_2$—O peak at δ4.81 ppm (s, 4H), CH=CH$_2$ peak at δ5.60 to 6.15 ppm (dd, 4H), and CH=CH$_2$ peak at δ5.87 ppm (dd, 2H) were confirmed. The viscosity was measured with a viscometer to confirm that the viscosity was 132 cP. The weight average molecular weight was confirmed to be 12,835 g/mol by GPC analysis.

rolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 5

1) Synthesis of Siloxane Monomer

A mixture of 145 g (0.49 mol) of octamethylcyclotetrasiloxane, 5.1 g (0.021 mol) of 1,3,5,7-tetramethyl-cyclotetrasiloxane, 7.4 g (0.014 mol) of 1,3-bis((acryloxymethyl)phenylethyl)tetramethyldisiloxane, 160 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 121 g, and the yield was 76.7%.

As a result of the analysis, the compound represented by Chemical Formula 1-7 below was synthesized.

The obtained product was analyzed by 400 MHz hydrogen nuclear magnetic resonance, and as a result, Si—CH$_3$ peak at δ0.06 to 0.12 ppm, Si—H peak at δ4.70 ppm (s, 6H), Si—CH$_2$—CH$_2$—Ar peak at δ0.55 ppm (t, 4H), Si—CH$_2$—CH$_2$—Ar peak at δ2.71 ppm (t, 4H), Ar—H peak at δ7.55 ppm (m, 8H), Al—CH$_2$—O peak at δ4.81 ppm (s, 4H), CH=CH$_2$ peak at δ5.60 to 6.15 ppm (dd, 4H), and

[Chemical Formula 1-6]

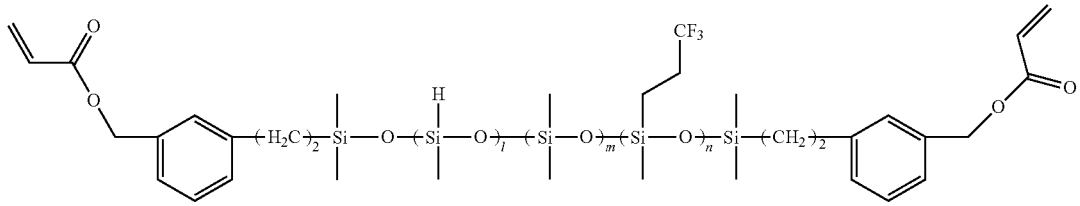

in Chemical Formula above, l=6, m=140, and n=10.

2) Preparation of Polymeric Composition 53 g of the siloxane monomer represented by Chemical Formula 1-6 prepared in 1) above, 42.0 g of N-vinylpyr- —CH=CH$_2$ peak at δ5.87 ppm (dd, 2H) were confirmed. The viscosity was measured with a viscometer to confirm that the viscosity was 110 cP. The weight average molecular weight was confirmed to be 11,270 g/mol by GPC analysis.

[Chemical Formula 1-7]

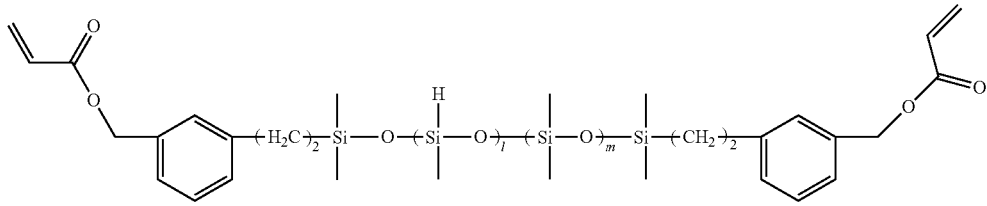

in Chemical Formula above, l=6; and m=140.

2) Preparation of Polymeric Composition 30.0 g of the siloxane monomer represented by Chemical Formula 1-7 prepared in 1) above, 65.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 6

1) Synthesis of Siloxane Monomer

A mixture of 74.0 g (0.25 mol) of octamethylcyclotetrasiloxane, 26.3 g (0.050 mol) of 1,3-bis((acryloxymethyl)phenylethyl)tetramethyldisiloxane, 100 g of chloroform, and 0.7 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 81.2 g, and the yield was 81.1%.

As a result of the analysis, the compound represented by Chemical Formula 1-8 below was synthesized.

The obtained product was analyzed by 400 MHz hydrogen nuclear magnetic resonance, and as a result, Si—$CH_3$ peak at $\delta$0.06 to 0.12 ppm, Si—$CH_2$—$CH_2$—Ar peak at $\delta$0.55 ppm (t, 4H), Si—$CH_2$—$CH_2$—Ar peak at $\delta$2.71 ppm (t, 4H), Ar—H peak at $\delta$7.55 ppm (m, 8H), Ar—$CH_2$—O peak at $\delta$4.81 ppm (s, 4H), CH=$CH_2$ peak at $\delta$5.60 to 6.15 ppm (dd, 4H), and —CH=$CH_2$ peak at $\delta$5.87 ppm (dd, 2H) were confirmed. The viscosity was measured with a viscometer to confirm that the viscosity was 71 cP. The weight average molecular weight was confirmed to be 2,011 g/mol by GPC analysis.

[Chemical Formula 1-8]

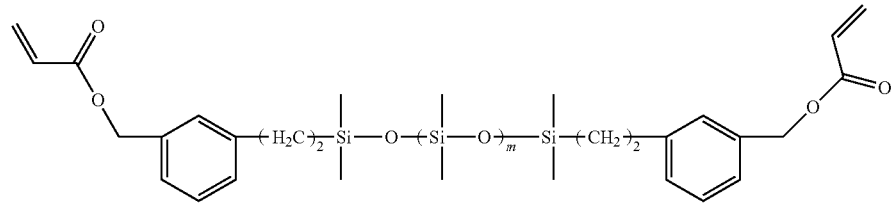

in Chemical Formula above, m=20.

2) Preparation of Polymeric Composition 20 g of the siloxane monomer represented by Chemical Formula 1-8 prepared in 1) above, 75.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 7

1) Synthesis of Siloxane Monomer

A mixture of 74.9 g (0.16 mol) of 1,3,5-trimethyltrifluoropropyl-cyclotrisiloxane, 25.3 g (0.048 mol) of 1,3-bis((acryloxymethyl)phenylethyl)tetramethyldisiloxane, 100 g of chloroform, and 0.7 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 80.5 g, and the yield was 80.3%.

As a result of the analysis, the compound represented by Chemical Formula 1-9 below was synthesized.

The obtained product was analyzed by 400 MHz hydrogen nuclear magnetic resonance, and as a result, Si—CH$_3$ peak at δ0.06 to 0.12 ppm, Si—CH$_2$—CH$_2$—CF$_3$ peak at δ0.70 ppm (t, 20H), Si—CH$_2$—CH$_2$—CF$_3$ peak at δ2.07 ppm (t, 20H), Si—CH$_2$—CH$_2$—Ar peak at δ0.55 ppm (t, 4H), Si—CH$_2$—CH$_2$—Ar peak at δ2.71 ppm (t, 4H), Ar—H peak at δ7.55 ppm (m, 8H), Ar—CH$_2$—O peak at δ4.81 ppm (s, 4H), CH═CH$_2$ peak at δ5.60 to 6.15 ppm (dd, 4H), and CH═CH$_2$ peak at δ5.87 ppm (dd, 2H) were confirmed. The viscosity was measured with a viscometer to confirm that the viscosity was 117 cP. The weight average molecular weight was confirmed to be 2,093 g/mol by GPC analysis.

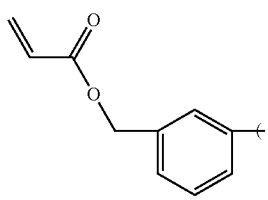
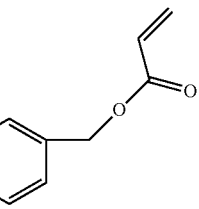

[Chemical Formula 1-9]

in Chemical Formula above, n=10.

2) Preparation of Polymeric Composition 15 g of the siloxane monomer represented by Chemical Formula 1-9 prepared in 1) above, 80.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

chloroform, and 0.7 g of trifluoromethanesulfonic acid was stirred at 25° C. for 24 hours, and then repeatedly washed with purified water until the pH of the mixture became neutral. After the water was separated, chloroform and volatile components were removed under reduced pressure'to obtain a transparent viscous liquid. The obtained amount was 76.5 g, and the yield was 76.3%.

As a result of the analysis, the compound represented by Chemical Formula 1-10 below was synthesized.

The obtained product was analyzed by 400 MHz hydrogen nuclear magnetic resonance, and as a result, Si—CH$_3$ peak at δ0.06 to 0.12 ppm, Si—H peak at δ4.70 ppm (s, 20H), Si—CH$_2$—CH$_2$—Ar peak at δ0.55 ppm (t, 4H), Si—CH$_2$—CH$_2$—Ar peak at δ2.71 ppm (t, 4H), Ar—H peak at δ7.55 ppm (m, 8H), Ar—CH$_2$—O peak at δ4.81 ppm (s, 4H), CH═CH$_2$ peak at δ5.60 to 6.15 ppm (dd, 4H), and —CH═CH$_2$ peak at δ5.87 ppm (dd, 2H) were confirmed. The viscosity was measured with a viscometer to confirm that the viscosity was 108 cP. The weight average molecular weight was confirmed to be 1,731 g/mol by GPC analysis.

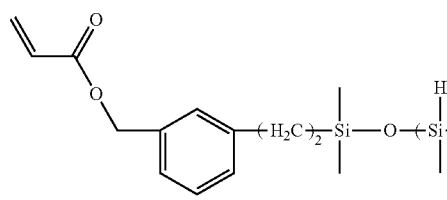
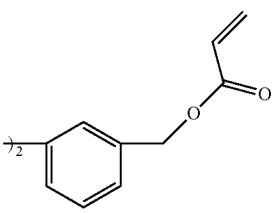

[Chemical Formula 1-10]

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 8

1) Synthesis of Siloxane Monomer (1) Synthesis of Siloxane Monomer Having Si—H: Synthesis Step 1

A mixture of 69.6 g (0.29 mol) of 1,3,5,7-tetramethylcyclotetrasiloxane, 30.6 g (0.058 mol) of 1,3-bis((acryloxymethyl)phenylethyl)tetramethyldisiloxane, 100 g of in Chemical Formula above, l=20.

(2) Synthesis of Siloxane Monomer Having PEG Functional Group: Synthesis Step 2

A mixture of 75 g of the above-synthesized siloxane monomer represented by Chemical Formula 1-10, 463 g (1.30 mol) of polyethylene glycol allyl methyl ether, 150 g of isopropyl alcohol, and 0.38 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 278 g and the yield was 72.5%. As a result of the analysis, a compound represented by Chemical Formula 1-11 was synthesized.

The obtained product was analyzed by 400 MHz hydrogen nuclear magnetic resonance, and as a result, it was confirmed that O—CH$_2$CH$_2$— peak was produced at δ3.15 to 3.90 ppm. The viscosity was measured with a viscometer to confirm that the viscosity was 275 cP. The weight average molecular weight was confirmed to be 8,855 g/mol by GPC analysis.

neutral. After the water was separated, chloroform and volatile components were removed under reduced pressure to obtain a transparent viscous liquid. The obtained amount was 79.5 g, and the yield was 79.8%.

[Chemical Formula 1-11]

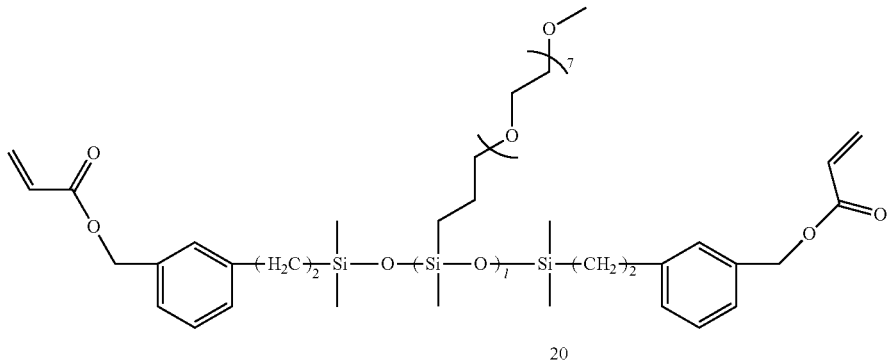

in Chemical Formula above, l=20.

2) Preparation of Polymeric Composition 50 g of the siloxane monomer represented by Chemical Formula 1-11 prepared in 1) above, 45.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

EXAMPLE 9

1) Synthesis of Siloxane Monomer (1) Synthesis of Siloxane Monomer Having Si—H: Synthesis Step 1

A mixture of 84.8 g (0.35 mol) of 1,3,5,7-tetramethylcyclotetrasiloxane, 14.9 g (0.028 mol) of 1,3-bis((acryloxymethyl)phenylethyl)tetramethyldisiloxane, 100 g of chloroform, and 0.8 g of trifluoromethanesulfonic acid was stirred at 25° C. for 24 hours, and then repeatedly washed with purified water until the pH of the mixture became As a result of the analysis, the compound represented by Chemical Formula 1-12 below was synthesized.

The obtained product was analyzed by 400 MHz hydrogen nuclear magnetic resonance, and as a result, Si—$CH_3$ peak at δ0.06 to 0.12 ppm, Si—H peak at δ4.70 ppm (s, 50H), Si—$CH_2$—$CH_2$—Ar peak at δ0.55 ppm (t, 4H), Si—$CH_2$—$CH_2$—Ar peak at δ2.71 ppm (t, 4H), Ar—H peak at δ7.55 ppm (m, 8H), Ar—$CH_2$—O peak at δ4.81 ppm (s, 4H), CH=$CH_2$ peak at δ5.60 to 6.15 ppm (dd, 4H), and —CH=$CH_2$ peak at δ5.87 ppm (dd, 2H) were confirmed. The viscosity was measured with a viscometer to confirm that the viscosity was 119 cP. The weight average molecular weight was confirmed to be 3,535 g/mol by GPC analysis.

[Chemical Formula 1-12]

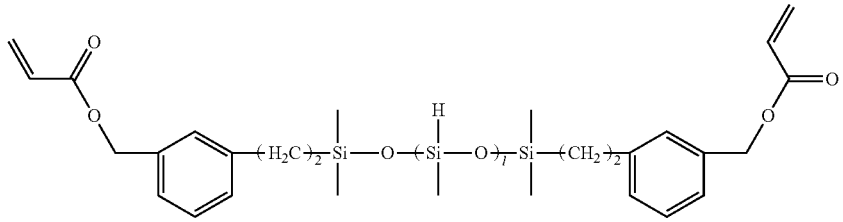

in Chemical Formula above, l=50.

(2) Synthesis of Siloxane Monomer Having PEG Functional Group: Synthesis Step 2

A mixture of 75 g of the above-synthesized siloxane monomer represented by Chemical Formula 1-12, 567 g (1.60 mol) of polyethylene glycol allyl methyl ether, 150 g of isopropyl alcohol, and 0.38 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 368 g and the yield was 81.3%. As a result of the analysis, a compound represented by Chemical Formula 1-13 was synthesized.

The obtained product was analyzed by 400 MHz hydrogen nuclear magnetic resonance, and as a result, it was confirmed that O—$CH_2CH_2$— peak was produced at δ3.15 to 3.90 ppm. The viscosity was measured with a viscometer to confirm that the viscosity was 327 cP. The weight average molecular weight was confirmed to be 21,346 g/mol by GPC analysis.

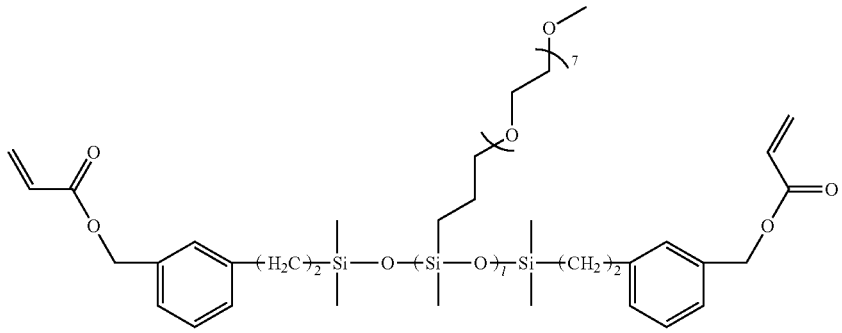

[Chemical Formula 1-13]

in Chemical Formula above, l=50.

2) Preparation of Polymeric Composition 60.0 g of the siloxane monomer represented by Chemical Formula 1-13 prepared in 1) above, 35.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 1

1) Synthesis of Siloxane Monomer
(1) Synthesis of Siloxane Monomer Having Si—H: Synthesis Step 1

A mixture of 147 g (0.50 mol) of octamethylcyclotetrasiloxane, 22.2 g (0.047 mol) of 1,3,5-trimethyltrifluoropropylcyclotrisiloxane, 5.1 g (0.021 mol) of 1,3,5,7-tetramethylcyclotetrasiloxane, 4.8 g (0.014 mol) of 1,3-bis((methacryloxypropyl)tetramethyldisiloxane) which is a compound represented by Chemical Formula 6 below, 180 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 153 g, and the yield was 85.3%.

As a result of the analysis, the compound represented by Chemical Formula 7-1 below was synthesized.

The obtained product was analyzed by 400 MHz hydrogen nuclear magnetic resonance, and as a result, Si—CH$_3$ peak at δ0.06 to 0.12 ppm, Si—CH$_2$—CH$_2$—CF$_3$ peak at δ0.70 ppm (m, 20H), Si—CH$_2$—CH$_2$—CF$_3$ peak at δ2.07 ppm (m, 20H), Si—H peak at δ4.70 ppm (s, 6H), —CH=CH$_2$ peak at δ5.60~6.15 ppm (dd, 4H), CCH$_3$=CH$_2$ at δ1.96 ppm (S, 6H), Si—CH$_2$—CH$_2$—CH$_2$—O peak at δ0.76 ppm (m, 4H), Si—CH$_2$—CH$_2$—CH$_2$—O peak at δ1.69 ppm (m, 4H), and Si—CH$_2$—CH$_2$—CH$_2$—O peak at δ3.94 ppm (m, 4H) were confirmed. The viscosity was measured with a viscometer to confirm that the viscosity was 119 cP. The weight average molecular weight was confirmed to be 12,645 g mol by GPC analysis.

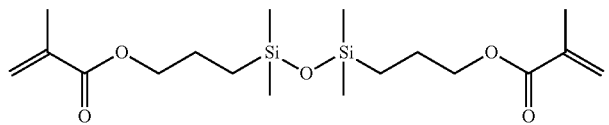

[Chemical Formula 6]

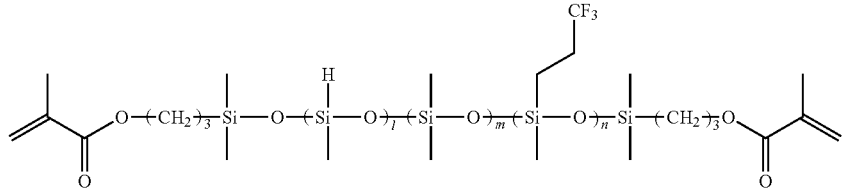

[Chemical Formula 7-1]

in Chemical Formula above, l=6, m=140, and n=10.

(2) Synthesis of Siloxane Monomer Having PEG Functional Group: Synthesis Step 2

A mixture of 125 g of the above-synthesized siloxane monomer represented by Chemical Formula 7-1, 31.7 g (0.089 mol) of polyethylene glycol allyl methyl ether, 250 g of isopropyl alcohol, and 0.64 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 114 g and the yield was 78.0%. As a result of the analysis, a compound represented by Chemical Formula 7-2 was synthesized.

The obtained product was analyzed by 400 MHz hydrogen nuclear magnetic resonance, and as a result, it was confirmed that O—$CH_2CH_2$— peak was produced at δ3.15 to 3.90 ppm. The viscosity was measured with a viscometer to confirm that the viscosity was 295 cP. The weight average molecular weight was confirmed to be 14,782 g/mol by GPC analysis.

tetrasiloxane, 4.8 g (0.014 mol) of 1,3-bis((methacryloxypropyl)tetramethyldisiloxane, 160 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 135 g, and the yield was 85.9%.

As a result of the analysis, the compound represented by Chemical Formula 8-1 below was synthesized.

The obtained product was analyzed by 400 MHz hydrogen nuclear magnetic resonance, and as a result, Si—$CH_3$ peak at δ0.06 to 0.12 ppm, Si—H peak at δ4.70 ppm (s, 6H),

[Chemical Formula 7-2]

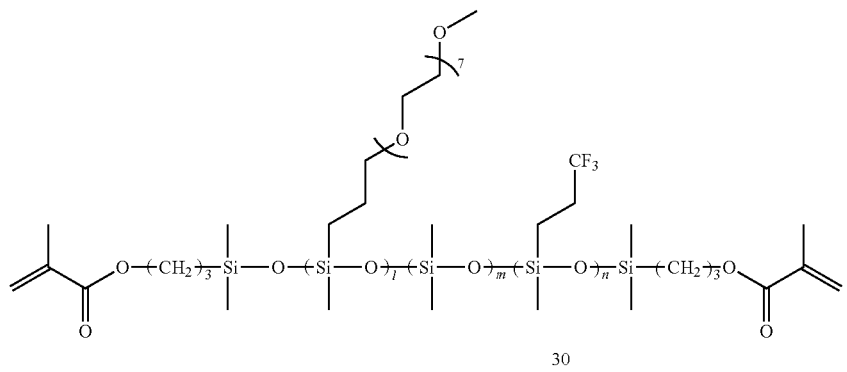

in Chemical Formula above, l=6, m=140, and n=10.

2) Preparation of Polymeric Composition 53 g of the siloxane monomer -represented by Chemical Formula 7-2 prepared in 1) above, 42.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

COMPARATIVE EXAMPLE 2

1) Synthesis of Siloxane Monomer (1) Synthesis of Siloxane Monomer Having Si—H: Synthesis Step 1

A mixture of 147 g (0.50 mol) of octamethylcyclotetrasiloxane, 5.1 g (0.021 mol) of 1,3,5,7-tetramethyl-cyclo- —CH═$CH_2$ peak at δ5.60 to 6.15 ppm (dd, 4H), $CCH_3$═$CH_2$ peak at δ1.96 ppm (S, 6H), Si—$CH_2$—$CH_2$—$CH_2$—O peak at δ0.76 ppm (m, 4H), Si—$CH_2$—$CH_2$—$CH_2$—O peak at δ1.69 ppm (m, 4H), and Si—$CH_2$—$CH_2$—$CH_2$—O peak at δ3.94 ppm (m, 4H) were confirmed. The viscosity was measured with a viscometer to confirm that the viscosity was 104 cP. The weight average molecular weight was confirmed to be 11,080 g/mol by GPC analysis.

[Chemical Formula 8-1]

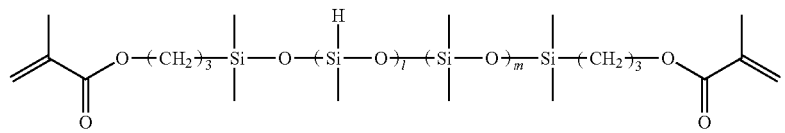

in Chemical Formula above, l=6 and m=140.

(2) Synthesis of Siloxane Monomer Having PEG Functional Group: Synthesis Step 2

A mixture of 125 g of the above-synthesized siloxane monomer represented by Chemical Formula 8-1, 36.2 g (0.10 mol) of polyethylene glycol allyl methyl ether, 250 g of isopropyl alcohol, and 0.64 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 121 g and the yield was 81.1%. As a result of the analysis, a compound represented by Chemical Formula 8-2 was synthesized.

The obtained product was analyzed by 400 MHz hydrogen nuclear magnetic resonance, and as a result, it was confirmed that O—CH$_2$CH$_2$— peak was produced at δ3.15 to 3.90 ppm. The viscosity was measured with a viscometer to confirm that the viscosity was 281 cP. The weight average molecular weight was confirmed to be 13,217 g/mol by GPC analysis.

[Chemical Formula 8-2]

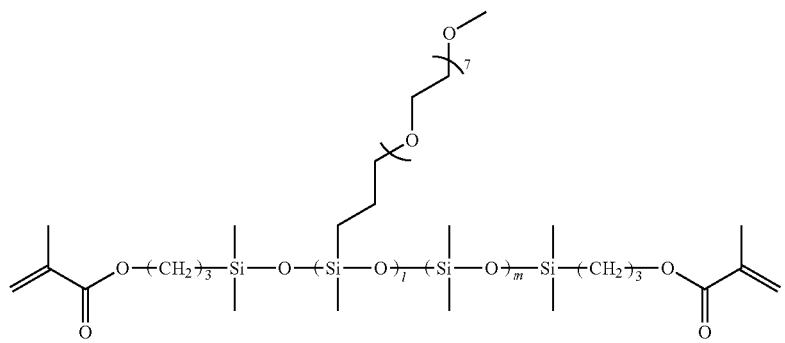

in Chemical Formula above, l=6, and m=140.

2) Preparation of polymeric composition 53.0 g of the siloxane monomer represented by Chemical Formula 8-2 prepared in 1) above, 42.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The physical properties of the prepared polymeric composition and the prepared silicone hydrogel contact lens were measured, and the results are shown in Table 1 below.

COMPARATIVE EXAMPLE 3

1) Synthesis of Siloxane Monomer

A mixture of 147 g (0.50 mol) of octamethylcyclotetrasiloxane, 22.2 g (0.047 mol) of 1,3,5-trimethyltrifluoropropylcyclotrisiloxane, 4.8 g (0.014 mol) of 1,3-bis(metacryloxympropyl)tetramethyldisiloxane, 180 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 147 g, and the yield was 84.4%.

As a result of the analysis, the compound represented by Chemical Formula 9 below was synthesized.

The obtained product was analyzed by 400 MHz hydrogen nuclear magnetic resonance, and as a result, Si—CH$_3$ peak at δ0.06 to 0.12 ppm, Si—CH$_2$—CH$_2$—CF$_3$ peak at δ0.70 ppm (m, 20H), Si—CH$_2$—CH$_2$—CF$_3$ peak at δ2.07 ppm (m, 20H), —CH=CH$_2$ peak at δ5.60 to 6.15 ppm (dd, 4H), CCH$_3$=CH$_2$ peak at δ1.96 ppm (S, 6H), Si—CH$_2$—CH$_2$—CH$_2$—O peak at δ0.76 ppm (m, 4H), Si—CH$_2$—CH$_2$—CH$_2$—O peak at δ1.69 ppm (m, 4H), and Si—CH$_2$—CH$_2$—CH$_2$—O peak at δ3.94 ppm (m, 4H) were confirmed. The viscosity was measured with a viscometer to confirm that the viscosity was 108 cP. The weight average molecular weight was confirmed to be 12,284 g/mol by GPC analysis.

[Chemical Formula 9]

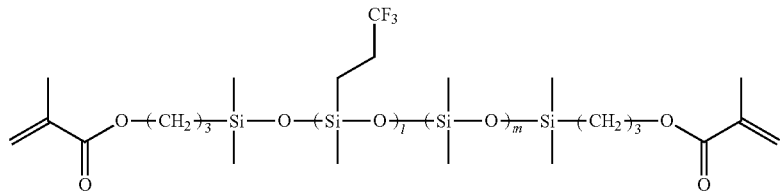

in Chemical Formula above, l=10 and m=140.

2) Preparation of Polymeric Composition 42 g of the siloxane monomer represented by Chemical Formula 9 prepared 1) above, 53.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 4

1) Synthesis of Siloxane Monomer

A mixture of 147 g (0.07 mol) of octamethylcyclotetrasiloxane, 22.2 g (0.047 mol) of 1,3,5-trimethyltrifluoropropylcyclotrisiloxane, 5.1 g (0.021 mol) of 1,3,5,7-tetramethylcyclotetrasiloxane, 4.8 g (0.014 mol) of 1,3-bis((methacryloxypropyl)tetramethyldisiloxane), 180 g of chloroform, and 1.5 g of trifluoromethanesulfonic acid was stirred at 25° C. for 24, hours, and then repeatedly washed with purified water until the pH of the mixture became neutral. After the water was separated, chloroform and volatile components were removed under reduced pressure to obtain a transparent viscous liquid. The obtained amount was 153 g, and the yield was 85.3%.

As a result of the analysis, the compound represented by Chemical Formula 10 below was synthesized.

The obtained product was analyzed by 400 MHz hydrogen nuclear magnetic resonance, and as a result, Si—$CH_3$ peak at δ0.06 to 0.12 ppm, Si—$CH_2$—$CH_2$—$CF_3$ peak at δ0.70 ppm (m, 20H), Si—$CH_2$—$CH_2$—$CF_3$ peak at δ2.07 ppm (m, 20H), Si—H peak at δ4.70 ppm (s, 6H), —CH=$CH_2$ peak at δ5.60 to 6.15 ppm (dd, 4H), $CCH_3$=$CH_2$ at δ1.96 ppm (S, 6H), Si—$CH_2$—$CH_2$—$CH_2$—O peak at δ0.76 ppm (m, 4H), Si—$CH_2$—$CH_2$—$CH_2$—O peak at δ1.69 ppm (m, 4H), and Si—$CH_2$—$CH_2$—$CH_2$—O peak at δ3.94 ppm (m, 4H) were confirmed. The viscosity was measured with a viscometer to confirm that the viscosity was 119 cP. The weight average molecular weight was confirmed to be 12,645 g/mol by GPC analysis.

assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 5

1) Synthesis of Siloxane Monomer

A mixture of 147 g (0.50 mol) of octamethylcyclotetrasiloxane, 5.1 g (0.021 mol) of 1,3,5,7-tetramethyl-cyclotetrasiloxane, 4.8 g (0.014 mol) of 1,3-bis((methacryloxypropyl)tetramethyldisiloxane), 160 g of chloroform, and 1.5 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 135 g, and the yield was 85.9%.

As a result of the analysis, the compound represented by Chemical Formula 11 below was synthesized.

The obtained product was analyzed by 400 MHz hydrogen nuclear magnetic resonance, and as a result, Si—$CH_3$ peak at δ0.06 to 0.12 ppm, Si—H peak at δ4.70 ppm (s, 6H), —CH=$CH_2$ peak at δ5.60 to 6.15 ppm (dd, 4H), $CCH_3$=$CH_2$ peak at δ1.96 ppm (S, 6H), Si—$CH_2$—

[Chemical Formula 10]

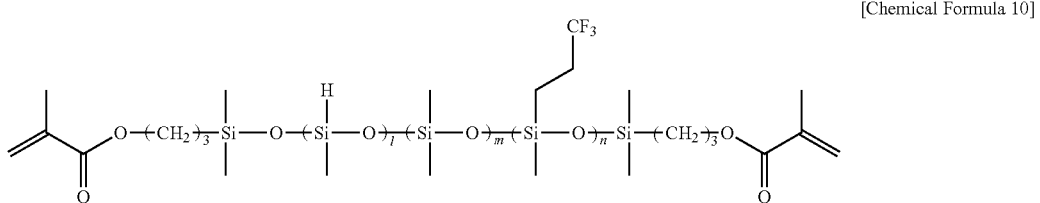

in Chemical Formula above, l=6, m=140, and n=10.

2) Preparation of Polymeric Composition 30 g of the siloxane monomer represented by Chemical Formula 10 prepared 1) above, 65.0 g of N-vinylpyrrolidone (NVP manufactured by Aldrich, V3409) and 4.5 g of 2-hy- $CH_2$—O peak at δ0.76 ppm (m, 4H), Si—$CH_2$—$CH_2$—$CH_2$—O peak at δ1.69 ppm (m, 4H), and Si—$CH_2$—$CH_2$—$CH_2$—O peak at δ3.94 ppm (m, 4H) were confirmed. The viscosity was measured with a viscometer to confirm that the viscosity was 104 cP. The weight average molecular weight was confirmed to be 11,080 g/mol by GPC analysis.

[Chemical Formula 11]

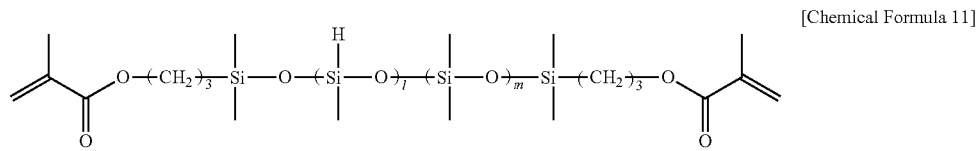

droxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was in Chemical Formula above, l=6 and m=140.

2) Preparation of Polymeric Composition 30 g of the siloxane monomer represented by Chemical Formula 11 prepared 1) above, 65.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681)

as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 6

1) Synthesis of Siloxane Monomer

A mixture of 0.81 g (0.28 mol) of octamethylcyclotetrasiloxane, 18.6 g (0.055 mol) of 1,3-bis(metacryloxypropyl)tetramethyldisiloxane, 100 g of chloroform, and 0.8 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 82.1 g, and the yield was 82.0%.

As a result of the analysis, the compound represented by Chemical Formula 12 below was synthesized.

The obtained product was analyzed by 400 MHz hydrogen nuclear magnetic resonance, and as a result, Si—$CH_3$ peak at $\delta$0.06 to 0.12 ppm, —CH=$CH_2$ peak at $\delta$5.60 to 6.15 ppm (dd, 4H), $CCH_3$=$CH_2$ peak at $\delta$1.96 ppm (S, 6H), Si—$CH_2$—$CH_2$—$CH_2$—O peak at $\delta$0.76 ppm (m, 4H), Si—$CH_2$—$CH_2$—$CH_2$—O peak at $\delta$1.69 ppm (m, 4H), and Si—$CH_2$—$CH_2$—$CH_2$—O peak at $\delta$3.94 ppm (m, 4H) were, confirmed. The viscosity was measured with a viscometer to confirm that the viscosity was 70 cP. The weight average molecular weight was confirmed to be 1,821 g/mol by GPC analysis.

[Chemical Formula 12]

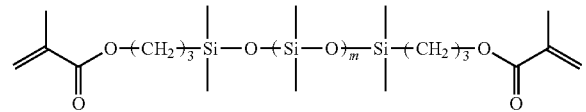

in Chemical Formula above, m=20.

2) Preparation of Polymeric Composition 20 g of the siloxane monomer represented by Chemical Formula 12 prepared 1) above, 75 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 7

1) Synthesis of Siloxane Monomer

A mixture of 82.3 g (0.18 mol) of 1,3,5-trimethyltrifluoropropyl-cyclotrisiloxane, 17.8 g (0.053 mol) of 1,3-bis(metacryloxypropyl)tetramethyldisiloxane, 100 g of chloroform, and 0.8 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 81.6 g, and the yield was 81.5%.

As a result of the analysis, the compound represented by Chemical Formula 13 below was synthesized.

The obtained product was analyzed by 400 MHz hydrogen nuclear magnetic resonance, and as a result, Si—$CH_3$ peak at $\delta$0.06 to 0.12 ppm, Si—$CH_2$—$CH_2$—$CF_3$ peak at $\delta$0.70 ppm (m, 20H), Si—$CH_2$—$CH_2$—$CF_3$ peak at $\delta$2.07 ppm (m, 20H), —CH=$CH_2$ peak at $\delta$5.60 to 6.15 ppm (dd, 4H), $CCH_3$=$CH_2$ peak at $\delta$1.96 ppm (S, 6H), Si—$CH_2$—$CH_2$—$CH_2$—O peak at $\delta$0.76 ppm (m, 4H), Si—$CH_2$—$CH_2$—$CH_2$—O peak at $\delta$1.69 ppm (m, 4H), and Si—$CH_2$—$CH_2$—$CH_2$—O peak at $\delta$3.94 ppm (m, 4H) were confirmed. The viscosity was measured with a viscometer to confirm that the viscosity was 109 cP. The weight average molecular weight was confirmed to be 1,903 g/mol measured by GPC analysis.

[Chemical Formula 13]

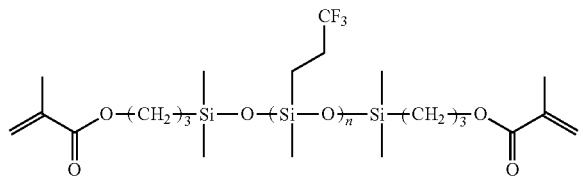

in Chemical Formula above, n=10.

2) Preparation of Polymeric Composition 15 g of the siloxane monomer represented by Chemical Formula 13 prepared 1) above, 80.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, arid then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 8

1) Synthesis of Siloxane Monomer (1) Synthesis of Siloxane Monomer Having Si—H: Synthesis Step 1

A mixture of 78.1 g (0.35 mol) of 1,3,5,7-tetramethylcyclotetrasiloxane, 22.0 g(0.028 mol) of 1,3-bis(metacryloxypropyl)tetramethyldisiloxane, 100 g of chloroform, and 0.8 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 82.3 g, and the yield was 82.2%.

As a result of the analysis, the compound represented by Chemical Formula 14-1 below was synthesized.

The obtained product was analyzed by 400 MHz hydrogen nuclear magnetic resonance, and as a result, Si—$CH_3$ peak at δ0.06 to 0.12 ppm, Si—H peak at δ4.70 ppm (s, 20H), —CH=$CH_2$ peak at δ5.60 to 6.15 ppm (dd, 4H), $CCH_3$—$CH_2$ peak at δ1.96 ppm (S, 6H), Si—$CH_2$—$CH_2$—$CH_2$—O peak at δ0.76 ppm (m, 4H), Si—$CH_2$—$CH_2$—$CH_2$—O peak at δ1.69 ppm (m, 4H), and Si—$CH_2$—$CH_2$—$CH_2$—O peak at δ3.94 ppm (m, 4H) were confirmed. The viscosity was measured with a viscometer to confirm that the viscosity was 103 cP. The weight average molecular weight was confirmed to be 1,541 g/mol measured by GPC analysis.

[Chemical Formula 14-1]

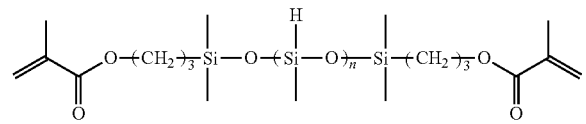

in Chemical Formula above, n=20.

(2) Synthesis of Siloxane Monomer Having PEG Functional Group: Synthesis Step 2

A mixture of 75 g of the above-synthesized siloxane monomer represented by Chemical Formula 14-1, 520 g (1.46 mol) of polyethylene glycol allyl methyl ether, 150 g of isopropyl alcohol, and 0.38 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 357 g and the yield was 84.7%. As a result of the analysis, a compound represented by Chemical Formula 14-2 was synthesized.

The obtained product was analyzed by 400 MHz hydrogen nuclear magnetic resonance, and as a result, it was confirmed that O—$CH_2CH_2$— peak was produced at δ3.15 to 3.90 ppm. The viscosity was measured with a viscometer to confirm that the viscosity was 277 cP. The weight average molecular weight was confirmed to be 8,665 g/mol measured by GPC analysis.

[Chemical Formula 14-2]

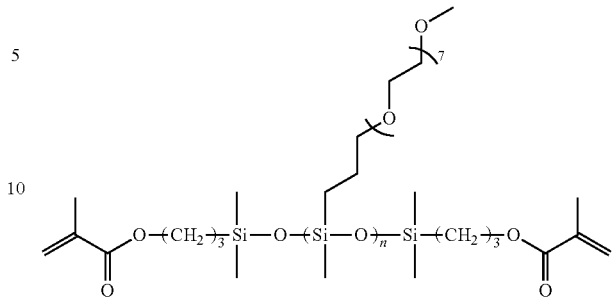

in Chemical Formula above, n=6.

2) Preparation of Polymeric Composition 50 g of the siloxane monomer represented by Chemical Formula 14-2 prepared in 1) above, 45.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

COMPARATIVE EXAMPLE 9

1) Synthesis of Siloxane Monomer (1) Synthesis of Siloxane Monomer Having Si—H: Synthesis Step 1

A mixture of 90.6 g (0.38 mol) of 1,3,5,7-tetramethylcyclotetrasiloxane, 10.2 g (0.30 mol) of 1,3-bis(metacryloxypropyl)tetramethyldisiloxane, 100 g of chloroform, and 0.9 g of trifluoromethanesulfonic acid was stirred at 25° C. for 24 hours, and then repeatedly washed with purified water until the pH of the mixture became neutral. After the water was separated, chloroform and volatile components were removed under reduced pressure to obtain a transparent viscous liquid. The obtained amount was 83.5 g, and the yield was 82.9%.

As a result of the analysis, the compound represented by Chemical Formula 15-1 below was synthesized.

The obtained product was analyzed by 400 MHz hydrogen nuclear magnetic resonance, and as a result, Si—$CH_3$ peak at δ0.06 to 0.12 ppm, Si—H peak at δ4.70 ppm (s, 50H), —CH=$CH_2$ peak at δ5.60 to 6.15 ppm (dd, 4H), $CCH_3$=$CH_2$ peak at δ1.96 ppm (S, 6H), Si—$CH_2$—$CH_2$—$CH_2$—O peak at δ0.76 ppm (m, 4H), Si—$CH_2$—$CH_2$—$CH_2$—O peak at δ1.69 ppm (m, 4H), and Si—$CH_2$—$CH_2$—$CH_2$—O peak at δ3.94 ppm (m, 4H) were confirmed. The viscosity was measured with a viscometer to confirm that the viscosity was 121 cP. The weight average molecular weight was confirmed to be 3,345 g/mol measured by GPC analysis.

[Chemical Formula 15-1]

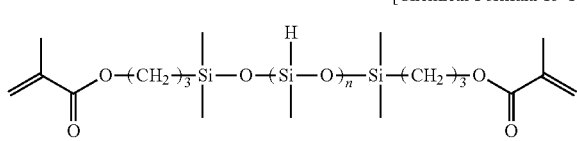

in Chemical Formula above, n=50.

(2) synthesis of Siloxane Monomer Having PEG Functional Group: Synthesis Step 2

A mixture of 75 g of the above-synthesized siloxane monomer represented by Chemical Formula 15-1, 599 g (1.46 mol) of, polyethylene glycol allyl methyl ether, 150 g of isopropyl alcohol, and 0.38 ml of a platinum catalyst was placed in a flask equipped with a reflux condenser, and heated under reflux while stirring for 3 hours. The reaction mixture was filtered, then isopropanol was removed under reduced pressure, and the obtained mixture was washed several times with a mixture of acetone and water in a volume ratio of 1:1. A volatile component was further removed under vacuum to obtain a transparent viscous liquid. The obtained amount was 378 g and the yield was 79.7%. As a result of the analysis, a compound represented by Chemical Formula 15-2 was synthesized.

The obtained product was analyzed by 400 MHz hydrogen nuclear magnetic resonance, and as a result, it was confirmed that O—CH$_2$CH$_2$— peak was produced at δ3.15 to 3.90 ppm. The viscosity was measured with a viscometer to confirm that the viscosity was 340 cP. The weight average molecular weight was confirmed to be 21,156 g/mol measured by GPC analysis.

[Chemical Formula 15-2]

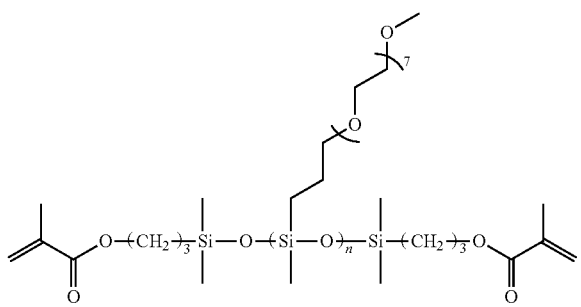

in Chemical Formula above, n=50.

2) Preparation of Polymeric Composition 60 g of the siloxane monomer represented by Chemical Formula 15-2 prepared in 1) above, 35.0 g of N-vinylpyrrolidone (NVP manufactured by Aldrich, V3409) and 4.5 g of 2-hydroxyethyl methacrylate (HEMA manufactured by Aldrich, 128635) as hydrophilic monomers, 0.5 g of ethylene glycol dimethacrylate (EGDMA manufactured by Aldrich, 335681) as a cross-linking agent, and 0.05 g of azobisisobutylonitrile (AIBN) as an initiator were mixed to prepare a polymeric composition.

The above-prepared polymeric composition was injected into a female mold for cast molding, and a male mold was assembled into the female mold. Next, the assembled mold was placed in a heat oven maintained at 100° C. and polymerized for 1 hour, and the mold was then separated to obtain a lens. The obtained lens was immersed in deionized water for 1 hour, and then subjected to high pressure sterilization in a phosphate buffered saline solution to prepare a silicone hydrogel contact lens.

The releasability and physical properties of the prepared lens were measured and shown in Table 1 below.

TABLE 1

| | Releasability (separation yield) | Water content | Oxygen permeability coefficient |
|---|---|---|---|
| Example 1 | Excellent (92%) | 45% | 115 |
| Example 2 | Excellent (93%) | 49% | 108 |
| Example 3 | Excellent (95%) | 55% | 87 |
| Example 4 | Excellent (88%) | 40% | 121 |
| Example 5 | Excellent (91%) | 57% | 78 |
| Example 6 | Excellent (89%) | 59% | 65 |
| Example 7 | Excellent (92%) | 60% | 57 |
| Example 8 | Excellent (90%) | 42% | 97 |
| Example 9 | Excellent (89%) | 38% | 132 |
| Comparative Example 1 | Normal (33%) | 47% | 105 |
| Comparative Example 2 | Normal (31%) | 51% | 101 |
| Comparative Example 3 | Poor (15%) | 56% | 81 |
| Comparative Example 4 | Poor (22%) | 43% | 115 |
| Comparative Example 5 | Poor (29%) | 61% | 82 |
| Comparative Example 6 | Poor (25%) | 57% | 61 |
| Comparative Example 7 | Poor (18%) | 58% | 59 |
| Comparative Example 8 | Normal (35%) | 44% | 101 |
| Comparative Example 9 | Poor (11%) | 41% | 122 |

As shown in Table 1, it could be appreciated that Examples to 9 according to the present invention had lower adhesion than those of Comparative Examples 1 to 9 to be easily releasable from a mold using a suction of a separator. On the other hand, it could be appreciated that Comparative Examples 1 to 9 had the separation yield of about 10% to 30%, which was difficult to be applied to the process.

Further, as shown in Examples 1 to 3, it could be appreciated that the oxygen permeability coefficient increased as the content of the siloxane monomer of the present invention increased.

Further, in Comparative Examples 1 to 9 in which the siloxane monomer containing no aromatic ring was used, when the lens was forcibly released from the mold, the lens was damaged, and the lens could be separated from the mold without damaging the lens only when applying the conventional method using a solvent.

The invention claimed is:

1. A siloxane monomer represented by Chemical Formula 1 below and used in preparation of a silicone hydrogel lens:

[Chemical Formula 1]

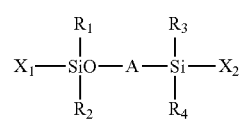

wherein

R$_1$, R$_2$, R$_3$ and R$_4$ are each independently selected from hydrogen and C$_1$-C$_{10}$ alkyl, A is selected from the group consisting of

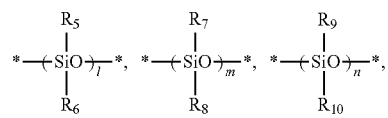

-continued

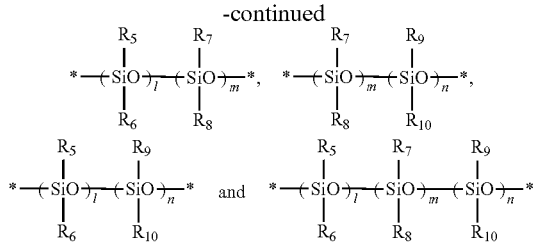

l, m and n are each independently an integer selected from 5 to 150, $R_5$ is hydrogen or

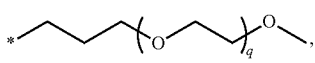

q is an integer of 5 to 15,
$R_6$ is methyl,
$R_7$ and $R_8$ are methyl,
$R_9$ is

$R_{10}$ is methyl,
$X_1$ and $X_2$ are each independently a substituent represented by Chemical Formula 3 below:

[Chemical Formula 3]

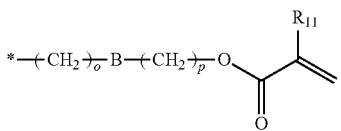

o and p are each independently an integer selected from 1 to 10,
B is $C_6$-$C_{10}$ arylene, and
$R_{11}$ is hydrogen or a methyl group.

2. The siloxane monomer of claim 1, wherein
$R_1$, $R_2$, $R_3$ and $R_4$ are methyl groups,
$X_1$ and $X_2$ are each independently a substituent represented by Chemical Formula 3-1 below:

[Chemical Formula 3-1]

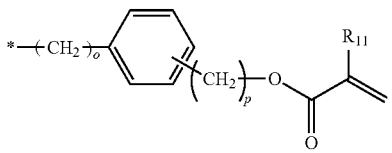

in Chemical Formula 3-1,
$R_{11}$ is hydrogen or methyl, and o and p are each independently an integer selected from 1 to 5.

3. A polymeric composition for preparing a silicone hydrogel lens comprising the siloxane monomer of claim 1.

4. The polymeric composition of claim 3, wherein the polymeric composition includes the siloxane monomer, a reactive monomer, a cross-linking agent, and an initiator.

5. The polymeric composition of claim 4, wherein the polymeric composition includes 5 to 60 wt% of the siloxane monomer, 35 to 90 wt% of the reactive monomer, 0.005 to 5 wt% of the cross-linking agent, and 0.005 to 2 wt% of the initiator.

6. The polymeric composition of claim 5, wherein the polymeric composition has a viscosity of 10 to 20,000 cP measured at 25° C.

7. The polymeric composition of claim 4, wherein the reactive monomer is any one or a mixture of two or more selected from the group consisting of a hydrophilic acrylic monomer and a hydrophilic silicone acrylic monomer.

8. The polymeric composition of claim 7, wherein the hydrophilic acrylic monomer is any one or a mixture of two or more selected from the group consisting of $C_1$-$C_{15}$ hydroxyalkyl methacrylate substituted with 1 to 3 hydroxy groups, $C_1$-$C_{15}$ hydroxyalkyl acrylate substituted with 1 to 3 hydroxyl groups, acrylamide, vinyl pyrrolidone, glycerol methacrylate, acrylic acid, and methacrylic acid, and the hydrophilic silicone acrylic monomer is any one or a mixture of two or more selected from the group consisting of tris(3-methacryloxypropyl)silane, 2-(trimethylsilyloxy)ethyl methacrylate, 3-tris(trimethylsilyloxy)silylpropyl methacrylate, 3-methacryloxypropyltris(trimethylsilyl)silane (MPTS), 3-methacryloxy-2-(hydroxypropyloxy)propylbis(trimethylsiloxy)methylsilane, and 4-methacryioxybutyl-terminated polydimethylsiloxane.

9. A silicone hydrogel lens comprising a copolymer obtained by polymerizing the polymeric composition of claim 4.

10. The silicone hydrogel lens of claim 9, wherein when the polymeric composition is cured in a mold to prepare a lens and is then sucked with a suction having the degree of vacuum of 5 to 50 mmHg, a separation yield according to Equation 1 below is 80% or more Separation yield=(number of lenses_separating from mold after suction/total number of lenses cured in mold)×100. [Equation 1]

11. A silicone hydrogel lens comprising the siloxane monomer unit of claim 1 and having a separation yield according to Equation 1 below of 80% or more when sucked with a suction haying the degree of vacuum of 5 to 50 mmHg Separation yield=(number of lenses separating from mold after suction/total number of lenses cured in mold)×100. [Equation 1]

12. A method for making a contact lens, comprising:
providing a composition comprising a siloxane monomer represented by Chemical Formula 1;
injecting the composition into a contact lens mold;
causing the siloxane monomer to polymerize in the contact lens mold to form a contact lens; and
releasing the contact lens from the mold,

[Chemical Formula 1]

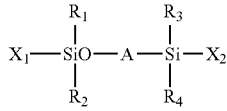

wherein $R_1$, $R_2$, $R_3$ and $R_4$ are each independently selected from hydrogen, $C_1$-$C_{10}$ alkyl
A is selected from the group consisting of

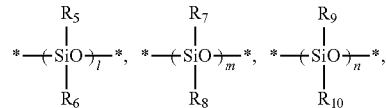

-continued

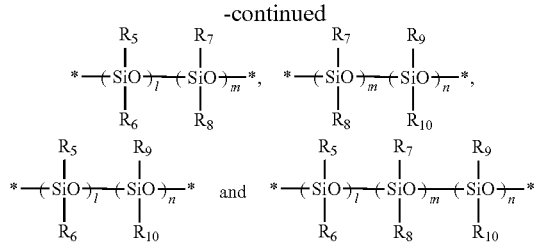

l, m and n are each independently an integer selected from 5 to 150, $R_5$ is hydrogen or

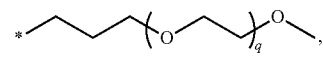

q is an integer of 5 to 15,
$R_6$ is methyl,
$R_7$ and $R_8$ are methyl, $R_9$ is

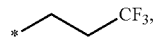

$R_{10}$ is methyl,
$X_1$ and $X_2$ are each independently a substituent represented by Chemical Formula 3:

[Chemical Formula 3]

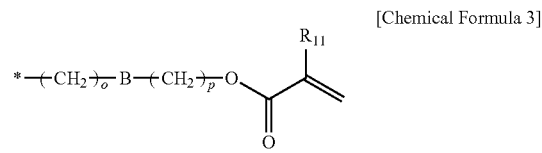

o and p are each independently an integer selected from 1 to 10,
B is $C_6$-$C_{10}$ arylene, and
$R_{11}$ is hydrogen or a methyl group.

* * * * *